US006556767B2

(12) United States Patent
Okayama et al.

(10) Patent No.: US 6,556,767 B2
(45) Date of Patent: Apr. 29, 2003

(54) VIDEO CAPTURE DEVICE

(76) Inventors: Masataka Okayama, G-605, 1053, Kamigo, Ebina-shi, Kanagawa 243-04 (JP); Tomohisa Kohiyama, 305, Mansion Akaseki, 523, Kamikashio-cho, Totsuka-ku, Yokohama-shi, Kanagawa 244 (JP); Nobukazu Kondo, G-205, 1053, Kamigo, Ebina-shi, Kanagawa 243-04 (JP); Kazutoshi Katoh, 202, Greencopo Kinuta, 397, Imazato, Ebina-shi, Kanagawa 243-04 (JP); Kazuaki Tanaka, 12-20, Tsubonomi, Sugita, Isogo-ku, Yokohama-shi, Kanagawa 235 (JP); Yoshihiro Harada, 514, 587-6, Shimoimaizumi, Ebina-shi, Kanagawa 243-04 (JP)

(*) Notice: Subject to any disclaimer, the term of this patent is extended or adjusted under 35 U.S.C. 154(b) by 0 days.

(21) Appl. No.: 09/875,907

(22) Filed: Jun. 8, 2001

(65) Prior Publication Data

US 2001/0053271 A1 Dec. 20, 2001

Related U.S. Application Data

(63) Continuation of application No. 09/526,739, filed on Mar. 16, 2000, now Pat. No. 6,269,215, which is a continuation of application No. 09/260,498, filed on Mar. 2, 1999, now Pat. No. 6,094,521, which is a continuation of application No. 08/750,826, filed on Dec. 13, 1996, now Pat. No. 5,899,575.

(51) Int. Cl.$^7$ ............................. H04N 9/81; H04N 9/00
(52) U.S. Cl. ................................ 386/31; 386/44
(58) Field of Search .......................... 386/31, 34, 38, 386/44, 1, 46, 95, 117, 107, 131; 348/446, 441, 448, 450; 360/32; H04N 9/79, 9/64

(56) References Cited

U.S. PATENT DOCUMENTS

| | | | |
|---|---|---|---|
| 4,779,144 A | * | 10/1988 | Dischert et al. |
| 5,223,942 A | * | 6/1993 | Sakaegi et al. |
| 5,249,052 A | | 9/1993 | Yoshimura et al. ......... 386/107 |
| 5,473,382 A | | 12/1995 | Nohmi et al. ............... 348/448 |
| 5,532,836 A | * | 7/1996 | Luyckx et al. |
| 5,539,455 A | | 7/1996 | Makioka ..................... 386/117 |
| 5,659,654 A | | 8/1997 | Nagasawa et al. .......... 386/120 |
| 5,666,459 A | | 9/1997 | Ohta et al. .................... 386/46 |
| 6,094,521 A | | 7/2000 | Okayama et al. ............. 386/44 |

FOREIGN PATENT DOCUMENTS

| | | |
|---|---|---|
| JP | 5-344495 | 12/1993 |
| JP | 6-133305 | 5/1994 |
| JP | 6-162116 | 6/1994 |

OTHER PUBLICATIONS

*Illustrated Up-to-date MPEG Textbook*, pp. 28–29, Multimedia Communications Research Group, ASCI Corp.
*Illustrated Up-to-date MPEG Textbook*, pp. 89–165, Multimedia Communications Research Group, ASCI Corp.
*Interface*, pp. 102–109, Apr. 1996, CQ Publishing Co.
"Enhanced PCI Bus Multimedia Controller" Zoran, ZR36057 (Data Sheets), Aug. 1996.
"JPEG Image Compression Processor" Zoran, ZR36050 (Data Sheets), Aug. 1996.

* cited by examiner

*Primary Examiner*—Robert Chevalier

(57) ABSTRACT

An object is to provide a video recording/playing apparatus for facilitating recording/playing of motion pictures. The configuration is provided with, at least, a video input device for inputting analog motion pictures (video), a video capture device for digitizing the motion pictures inputted through the video input device and recording the digitized motion pictures and, at the same time, for converting the motion pictures inputted through the video input device into compressed motion pictures capable of being played in a high compression ratio and in a high picture quality and recording the compressed motion pictures, an information extracting device for extracting arbitrary information from the non-compressed motion pictures captured by the video capture device, a correspondence information generating device for associating the information extracted by the information extracting device with the compressed motion pictures captured by the video capture device, an input device for designating a result of the correspondence, and a compressed video playing device for playing the compressed motion pictures.

26 Claims, 20 Drawing Sheets

NON-COMPRESSED MOTION PICTURES

MOTION PICTURES AFTER CODING (ORIGINAL IMAGE SEQUENCE)

MOTION PICTURES AFTER CODING (BIT STREAM SEQUENCE)

FIG.7

| ID | NON-COMPRESSED IMAGE POINTER | COMPRESSED FILE NAME | TIME CODE | INDEX |
|---|---|---|---|---|
| #1 | POINTER 1 | FILE 1 | TC 1 | IND 1 |
| #2 | POINTER 2 | FILE 1 | TC 1 | IND 3 |
| #3 | POINTER 3 | FILE 1 | TC 2 | IND 1 |
| ⋮ | ⋮ | ⋮ | | ⋮ |
| #N | POINTER N | FILE M | TC 2 | IND 5 |

(N,M BEING 1 OR LARGER)

| ID | NON-COMPRESSED IMAGE POINTER | COMPRESSED FILE NAME | TIME CODE | INDEX |
|---|---|---|---|---|
| | | | | |
| #N | POINTER 1 | FILE 1 | TC 1 | IND 5 |
| #N+1 | POINTER 2 | FILE 1 | TC 1 | IND 7 |
| ⋮ | ⋮ | ⋮ | | ⋮ |
| | | | | |

301 — #N row
302 — #N+1 row (N BEING 1 OR LARGER)

| | INPUT RESOLUTION 301 | OUTPUT RESOLUTION 302 | COLOR FORMAT 303 | TRANSFER DESTINATION ADDRESS 304 |
|---|---|---|---|---|
| ODD-NUMBERED FIELD DATA | 640X240 | 160X120 | RGB24 | 10000000 | 310
| EVEN-NUMBERED FIELD DATA | 640X240 | 320X240 | RGB8 | 20000000 | 320
| COMPRESSED MOTION PICTURE DATA | — | — | — | 30000000 | 330

VIDEO CAPTURE DEVICE

This application is a continuation of Ser. No. 09/526,739 filed Mar. 16, 2000 U.S. Pat. No. 6,269,215 which is a continuation of Ser. No. 09/260,498 filed Mar. 2, 1999, U.S. Pat. No. 6,094,521 which is a continuation of Ser. No. 08/750,826 filed Dec. 13, 1996, U.S. Pat. No. 5,899,576.

TECHNICAL FIELD

The present invention relates to an apparatus for capturing, recording and playing input motion pictures and particularly to an apparatus for playing motion pictures from a free scene (position).

BACKGROUND TECHNIQUE

A conventional video recording/playing apparatus has such a configuration as shown in FIG. 10.

As shown in FIG. 10, the video recording/playing apparatus comprises an information processing system 21, and a video input device 22. The video input device 22 is means for inputting analog motion pictures and is carried out in a video camera, a video tape recorder (VTR), a television set, or the like. The case of a video camera is shown here as an example. The information processing system 21 is a system for recording motion pictures inputted through the video input device 22 and has a means for digitizing analog motion pictures inputted through the video input device 22, and a means for recording the motion pictures digitized by the digitizing means.

The outline of processing in the conventional video recording/playing apparatus having the configuration shown in FIG. 10 will be described below with reference to FIG. 11.

FIG. 11 is a flow chart of processing for specifying scene-changed points with respect to a series of continuous still images (motion pictures) inputted through the video input device 22, for example, for the purpose of head-review playing.

In the processing, capturing motion pictures is first started (step 501) and a one-frame's or one-field's analog still image inputted through the video input device 22 is digitized (step 502). The motion pictures inputted here through the video input device 22 have a standardized format such as NTSC, PAL or SECAM.

In the aforementioned processing, the digitized still image is then stored in a main storage device contained in the information processing system 21 (step 503). The still image is then compared with a still image stored just before the still image (step 504) and a judgment is made as to whether there is any scene change or not (step 505). In this occasion, the judgment as to whether there is any scene change or not is performed by comparing two still images pixel by pixel, calculating differences between pixels and calculating the sum of differences between all pixels. When, for example, the sum exceeds an arbitrary threshold, it is judged that there is some scene change.

When it is judged in the step 505 that there is some scene change, the point of time counted from the start of the capturing of motion pictures is stored in the main storage device (step 506). A judgment is then made as to whether the capture is completed or not (step 507) and, if the capture is not completed, the situation of the routine goes back to the step 502 to repeat the processing. If the capture is completed, a series of non-compressed motion pictures is stored in an auxiliary storage device contained in the information processing system 21 (step 508) and the processing is terminated.

The aforementioned conventional video recording/playing apparatus then displays a list of still images of the scene-changed positions on a display device contained in the information processing system 21, extracts the point of time stored in the main storage device in the step 506 and corresponding to an arbitrary still image designated from the displayed list by a user through an input device contained in the information processing system 21 and plays a series of motion pictures stored in the auxiliary storage device in the step 508 so that the head-review playing of the series of motion pictures is started from a still image (position) corresponding to the point of time.

A technique in which the change of a scene in motion pictures is extracted automatically so that the motion pictures inclusive of the scene-changed information are encoded, has been disclosed in JP-A-6-133305.

A technique for real-time displaying motion pictures on a display device, or the like, has been described in the magazine "Interface", April issue, pp.102–109, 1996, published by CQ Publishing Co.

In the conventional technique as shown in FIG. 10, however, there is no consideration of the quantity of data stored in the auxiliary storage device because a series of non-compressed motion pictures is captured and a scene change is detected so that the series of motion pictures is stored as non-compressed data in the auxiliary storage device.

Further, in JP-A-6-133305, there is no consideration of processing speed because the scene-changed information is included in the compressed motion pictures so that the scene-changed information must be retrieved from the motion pictures from the first to the last before playing whenever playing is tried.

Further, in the technique described in the magazine "Interface", there is no consideration of displaying of motion pictures on a display device and recording of the motion pictures in an auxiliary storage device, or the like.

An object of the present invention is to provide a video capture device for real-time and simultaneously capturing motion pictures inputted through a video input device, as non-compressed motion pictures and as motion pictures which are compressed in a relatively high compression ratio by using a compressing technique and which can be played in high picture quality, a video recording/playing apparatus having the video capture device attached thereto, and a video input device.

Another object of the present invention is to provide a video recording/playing apparatus for performing video recording/playing in which an arbitrary still image in the aforementioned non-compressed motion pictures and an arbitrary still image in the aforementioned compressed motion pictures are associated with each other on the basis of information obtained on the basis of the non-compressed motion pictures to thereby make it possible to facilitate recording/playing of the motion pictures.

A further object of the present invention is to provide a video capture device in which odd-numbered field data and even-numbered field data in an interlace signal inputted through the aforementioned video input device are converted into data of different sizes and different color formats to be transferred to a different area or a different system when the aforementioned non-compressed motion pictures are captured in the aforementioned information processing system, and a video recording/playing apparatus having the video capture device attached thereto and for performing recording/playing of motion pictures inputted through the aforementioned video input device while monitoring the motion pictures through a display device contained in the aforementioned information processing system.

DISCLOSURE OF THE INVENTION

A video capture device attached to a video recording/playing apparatus having a main storage device and a display device and for recording motion pictures, comprises: a video decoder for receiving analog motion pictures and digitizing the input motion pictures; a motion picture compressing portion for compressing the digitized motion pictures into compressed motion pictures; and a motion picture input interface portion for transferring the digitized motion pictures outputted from the video decoder to the main storage device and the display device and, at the same time, transferring the compressed motion pictures outputted from the motion picture compressing portion to the main storage device.

A video recording/playing apparatus provided with a main storage device and a display device and for recording motion pictures, wherein the apparatus comprises: a video decoder for receiving analog motion pictures and digitizing the input motion pictures; a motion picture compressing portion for compressing the digitized motion pictures into compressed motion pictures; and a motion picture input interface portion for transferring the digitized motion pictures outputted from the video decoder to the main storage device and the display device and, at the same time, transferring the compressed motion pictures outputted from the motion picture compressing portion to the main storage device, and wherein the motion picture input interface portion separates the digitized motion pictures into two field signals in an interlace signal so that one field signal is transferred to the main storage device and the other field signal is transferred to the display device, the display device displays motion pictures on the basis of the field signal transferred from the motion picture input interface portion, and the main storage device stores the field signal transferred from the motion picture input interface portion at the same time when the display device displays the motion pictures.

The video recording/playing apparatus further comprises a frame memory for holding at least one frame image of the motion pictures digitized by the video decoder, wherein: the motion picture input interface portion includes a video signal input/output portion for separating the input motion pictures digitized by the video decoder into odd-numbered field data and even-numbered field data and storing the odd-numbered field data and the even-numbered field data in the frame memory, a scaling portion for picking out the odd-numbered field data and the even-numbered field data successively from the frame memory and scaling the data, a color conversion portion for converting the input data given from the scaling portion into data of a predetermined color format, a compressed video input/output portion for capturing the input data from the motion picture compressing portion in accordance with a predetermined protocol, a DMA transfer control portion for transferring the data supplied from the color conversion portion and the compressed motion pictures given from the compressed video input/output portion, to the main storage device or the display device, and a bus input/output portion for making data flow in a bus generally used in an information processing system and for getting data flowing in the bus.

There is further considered a video recording/playing apparatus characterized in that the apparatus comprises an information extracting means for extracting arbitrary information from non-compressed motion pictures captured by the aforementioned video capture means, and a correspondence information generating means for associating the information extracted by the information extracting means with the compressed motion pictures captured by the video capturing means, wherein: the information extracting means has a function of extracting the point of time of an image at an arbitrary point of time elapsed from the start of the motion pictures from the series of non-compressed motion pictures captured by the non-compressed video capture device; and the correspondence information generating means has a function of extracting an image (position) at the same point of time as the point of time from the compressed motion pictures captured by the compressed video capture device and associating the image (position) in the compressed motion pictures with the image in non-compressed motion pictures.

There is also considered the video recording/playing apparatus characterized in that the apparatus further comprises an input device for performing a user's instruction, and a compressed video playing device for playing the compressed motion pictures, wherein the compressed video playing device has a function of head-review playing of the compressed motion pictures from the associated image or the neighborhood thereof on the basis of the instruction inputted by the input means.

It is further considered a configuration in which the video capture device and the compressed video playing device are combined.

The video recording/playing apparatus according to the present invention carries out the following operation.

With some instruction inputted by the user through the input means as a turning point, the video capture device digitizes motion pictures inputted through the video input device and captures the digitized motion pictures directly as non-compressed motion pictures on one hand and the video capture device digitizes motion pictures inputted through the video input device, converts the digitized motion pictures into compressed motion pictures which is in a high compression ratio and which can be reproduced in a high picture quality, and captures the compressed motion pictures on the other hand. In this occasion, the two kinds of motion pictures are generated from one and the same video source and captured in real time and simultaneously.

When, for example, a scene change is to be detected, the information extracting means extracts at least an image just after the scene change obtained by analysis of the non-compressed motion pictures and a point of time of the image counted from the start of the capture of the motion pictures and the correspondence information generating means extracts at least an image (position) at the same point of time as the above-mentioned point of time from the compressed motion pictures captured by the video capture device and generates correspondence information for associating the two kinds of motion pictures with each other.

Furthermore, because the non-compressed motion pictures are separated into odd-numbered field data and even-numbered field data to be transferred alternatively to the main storage device and the display device, scene changes can be detected while motion pictures inputted through the video input device are monitored on the display device.

Furthermore, when at least an image just after the scene change is displayed on the display device and designated through the input means by the user, the compressed video playing device specifies the image from which the head-review playing of the compressed motion pictures will be started, and performs the playing.

BRIEF DESCRIPTION OF DRAWINGS

FIG. 7 is an explanatory view showing a data structure of the correspondence table;

FIG. 8 is an explanatory view showing a data structure of the correspondence table;

FIG. 17 is a view showing an example of the register configuration of the video capture device in the best-mode embodiment;

BEST MODES FOR CARRYING OUT THE INVENTION

A best-mode embodiment according to the present invention will be described below with reference to the drawings.

Figure 14:
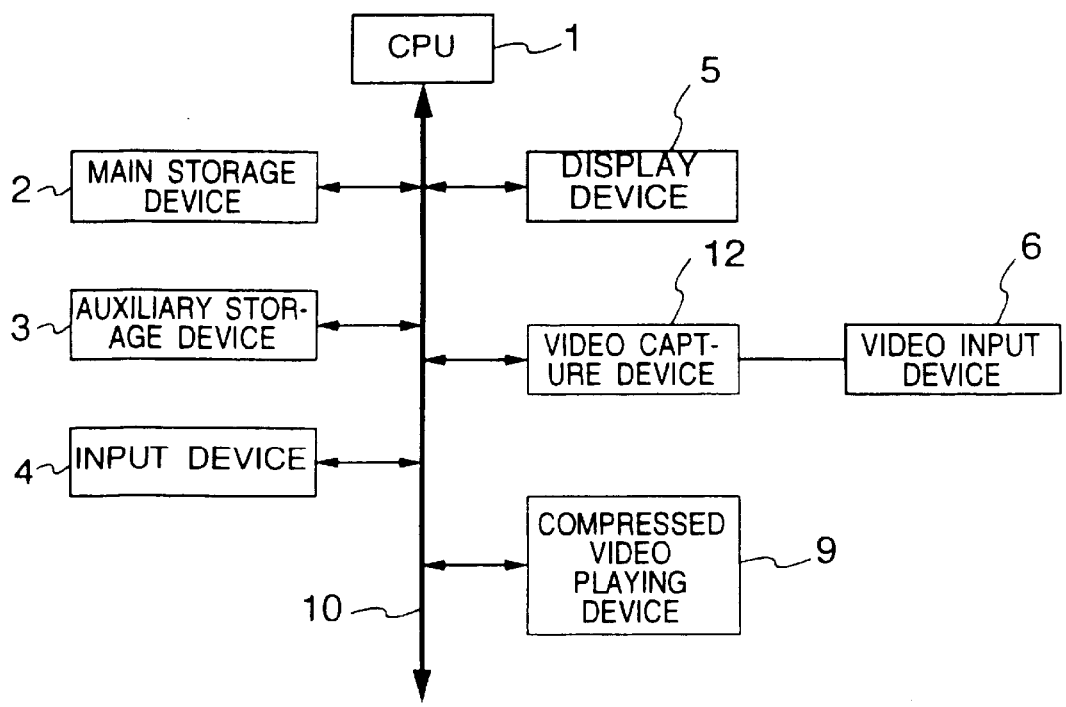
FIG. 14 is a hardware configuration diagram of the video recording/playing apparatus according to the best-mode embodiment.

FIG. 14 is a hardware configuration diagram of an information processing system such as a personal computer, or the like, to which a video recording/playing apparatus according to the best-mode embodiment of the invention can be applied.

As shown in FIG. 14, the information processing system comprises a CPU 1, a main storage device 2, an auxiliary storage device 3, an input device 4, a display device 5, a video input device 6, a video capture device 12, and a compressed video decoder 9. Respective constituent elements except the video input device 6 are connected by a bus 10 so that necessary information can be transmitted between the respective constituent elements.

Figure 22:
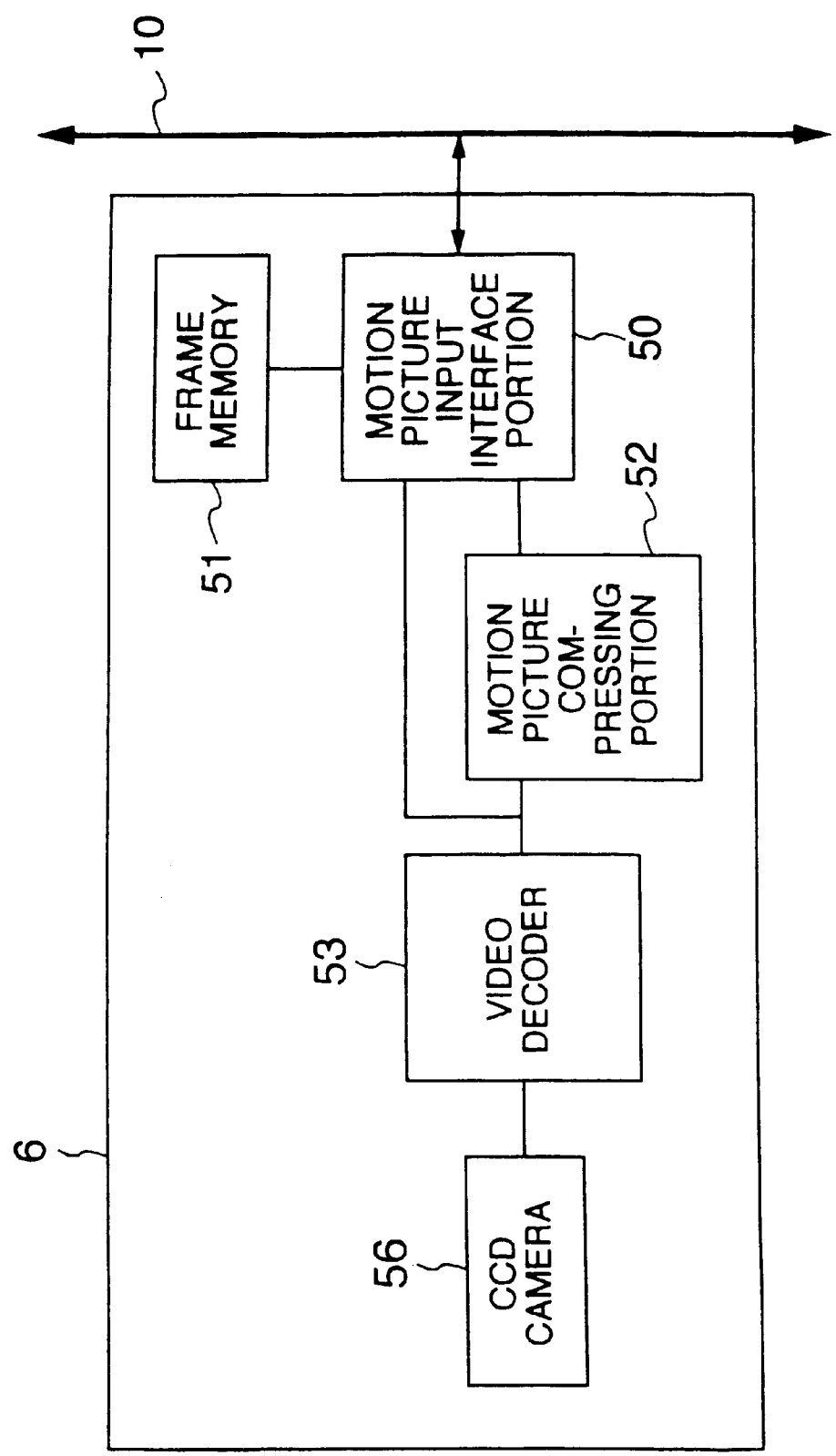
FIG. 22 is a diagram showing the video input device containing the video capture device according to the present invention.

The video input device 6 is connected to the video capture device 12 so that video information can be transmitted from the video input device 6 to the video capture device 12. The video capture device 12 is designed to be attached to an information processing system 21 such as a personal computer, or the like, constituted by the CPU 1, and so on, connected by the bus or to be contained in the video input device 6 as shown in FIG. 22. Incidentally, the video capture device shown in FIG. 22 is configured in the same manner as the video capture device 12 shown in FIG. 15 except that the video capture device shown in FIG. 22 contains a CCD camera 56.

The main storage device 2 is a means which serves as a work area and also serves as means for storing necessary programs. For example, the former can be realized by an RAM and the latter can be achieved by an ROM etc. The auxiliary storage device 3 is means for storing programs for controlling the operation of the apparatus and storing compressed motion pictures, and so on. For example, the auxiliary storage device 3 can be realized by a floppy disk, a hard disk, a memory card, a DVD, or the like. The input device 4 is means for inputting necessary instructions and information. For example, the input device 4 can be realized by a keyboard or a pointing device such as a mouse, or the like. The display device 5 is means for displaying various kinds of information such as reproducing and displaying of compressed motion pictures, or the like. For example, the display device 5 can be realized by a CRT, an EL display, a plasma display, a liquid crystal display, or the like.

Similarly to the video input device 22 in the prior art, the video input device 6 is means for inputting analog motion pictures (video) and can be realized by a video camera, a VTR, a television set, a TV tuner, or the like. The video capture device 12 is means for digitizing analog motion pictures inputted through the video input device 6 and compressing the digitized motion pictures. For example, the compressing (encoding) means used in the video capture device 12 can be realized by MPEG (Moving Picture Experts Group), or the like, in which reproducing can be made with a high compression ratio and with a high picture quality. Alternatively, the compressing means can be also achieved by a compressing technique described in "Illustrated Up-to-date MPEG Textbook", pp.28–29, edited by the Multimedia Communication Research Group, ASCII Corp. The details of the MPEG compressing technique has been disclosed in "Illustrated Up-to-date MPEG Textbook", pp.89–165, edited by the Multimedia Communication Research Group, ASCII Corp.

The compressed video decoder 9 is means for reproducing motion pictures compressed by using the compressing technique in the video capture device 12 and displaying the reproduced motion pictures on the display device 5. When, for example, the compressing technique is MPEG, the compressed video decoder 9 can be realized by an MPEG decoder.

The CPU 1 performs a predetermined operation in accordance with a program which is stored in the main storage device 2 or the auxiliary storage device 3 in advance.

Figure 15:
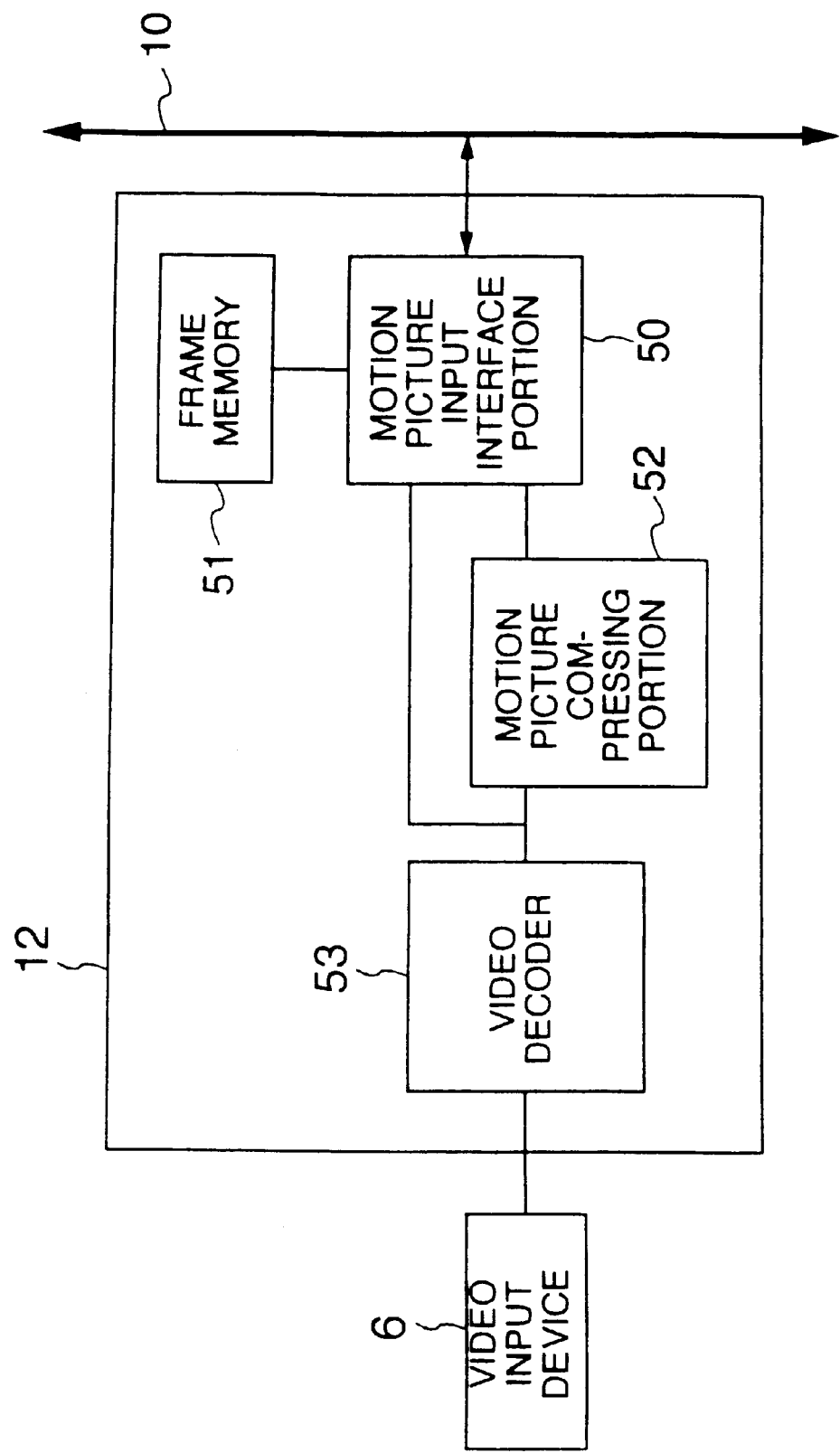
FIG. 15 is a hardware configuration diagram of the video capture device according to the best-mode embodiment.

FIG. 15 is a block configuration diagram of the video capture device 12.

As shown in FIG. 15, the video capture device 12 includes a motion picture input interface portion 50, a frame memory 51, a motion picture compressing portion 52, and a video decoder 53.

The video decoder 53 is connected to the video input device 6 and for digitizing analog motion pictures inputted through the video input device 6 and outputting the digitized motion pictures. When, for example, an NTSC-format signal is used for the analog motion pictures inputted through the video input device 6, the video decoder 53 can be realized by an NTSC decoder. In this case, odd-numbered field signals and even-numbered field signals in an NTSC-format interlace signal are digitized to be outputted in the form of a time series. The output motion pictures are inputted both to the motion picture compressing portion 52 and to the motion picture input interface portion 50 simultaneously. Incidentally, when the signal outputted from the video input device 6 to the video capture device 12 is not an analog signal but a digital signal, the video capture device 12 dose not need the video decoder 53.

The motion picture compressing portion 52 uses a compressing technique such as MPEG, or the like, for compressing the digitized motion pictures outputted from the video decoder 53 and outputting the compressed motion pictures to the motion picture input interface portion 50. When, for example, the compressing technique is MPEG, the motion pictures are compressed as an MPEG stream.

The frame memory 51 serves to hold at least one frame still image of the motion pictures digitized by the video decoder 53 and is connected to the motion picture input interface portion 50.

The motion picture input interface portion 50 is connected to the bus 10, serves to store the digital motion pictures given from the video decoder 53 in the frame memory 51 once, and serves to DMA-transfer the image stored in the frame memory 51 to the main storage device 2, the auxiliary storage device 3 or the display device 5 through the bus 10. At the same time, the compressed motion pictures supplied from the motion picture compressing portion 52 are also DMA-transferred to the main storage device 2 or the auxiliary storage device 3 through the bus 10.

Figure 16:
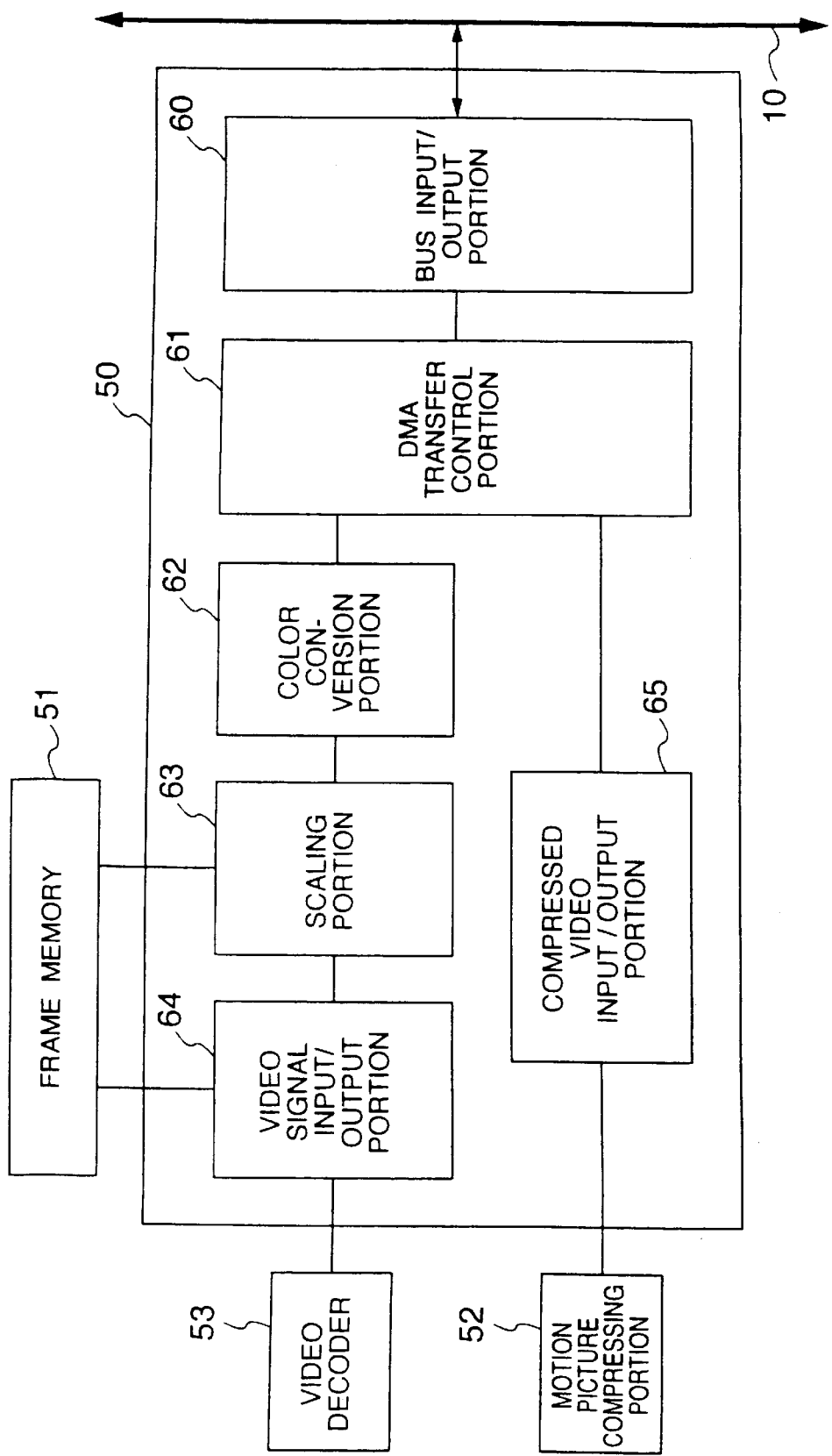
FIG. 16 is a hardware configuration diagram of the motion picture input interface portion according to the best-mode embodiment.

FIG. 16 is a block configuration diagram of the motion picture input interface portion 50.

As shown in FIG. 16, the motion picture input interface portion 50 has a bus input/output portion 60, DMA transfer control portion 61, a color conversion portion 62, a scaling portion 63, a video signal input/output portion 64, and a compressed image input/output portion 65.

The bus input/output portion 60 can be achieved in accordance with a bus protocol such as PCI bus protocol, ISA bus protocol, or the like, generally used in an information processing system, or the like. The bus input/output portion 60 serves to make data flow in the bus 10 and serves also to get data flowing in the bus 10.

The compressed image input/output portion 65 serves to supply the DMA transfer control portion 61 data inputted from the motion picture compressing portion 52 in accordance with a predetermined protocol.

The video signal input/output portion 64 stores the digitized motion pictures inputted from the video decoder 53 in the frame memory 51. When the video decoder 53 is an NTSC decoder, odd-numbered field data and even-numbered field data in the motion pictures, that is, in an interlace signal are supplied in time series and a signal indicating whether the current input data is an odd-numbered field data or an even-numbered field data is supplied from the video decoder 53 to the video signal input/output portion 64. Accordingly, the respective field data are stored separately in predetermined areas of the frame memory 51 in accordance with the signal. When the frame memory 51 has no capacity except the capacity for storing one frame data (composed of an odd-numbered field data and an even-numbered field data), the respective field data are stored so as to be written over the field data stored previously.

The scaling portion 63 picks out one-frame odd-numbered field data and one-frame even-numbered field data successively from the frame memory 51, scales the data to a predetermined size and outputs the scaled data to the color conversion portion 62.

The color conversion portion 62 converts the data supplied from the scaling portion 63 into data of a predetermined color format and outputs the data to the DMA transfer control portion 61. In the case of image data of the NTSC signal, the color format is generally a YUV format, so that the YUV-format data is stored in the frame memory 51. The color format of data to be transferred to the main storage device 2 and the display device 5 is, however, in most cases, an RGB format. Accordingly, the color conversion portion 62 has at least a function of converting the YUV format into the RGB format.

The DMA transfer control portion 61 DMA-transfers the data supplied from the color conversion portion 62 and the compressed motion pictures supplied from the compressed image input/output portion 65 to the main storage device 2, the auxiliary storage device 3 or the display device 5 through the bus input/output portion 60 and the bus 10. Because the video decoder 53 and the motion picture compressing portion 52 operate asynchronously, data may be given from the color conversion portion 62 and the compressed image input/output portion 65 simultaneously. In this case, the compressed motion pictures from the compressed image input/output portion 65 are DMA-transferred preferentially. This is because data do not make sense as a whole if even only a part of data is missing from the compressed motion pictures.

FIG. 17 shows an example of the configuration of registers included in the motion picture input interface portion 50.

Registers are at least composed of input resolution registers 301, output resolution registers 302, color format registers 303, and transfer destination address registers 304.

The input resolution registers 301 designate the resolution of data inputted through the video decoder 53. The output resolution registers 302 designate the resolution of data outputted onto the bus 10. The color format registers 303 designate the color format of data outputted onto the bus 10. The transfer destination address registers 304 designate the address to which data outputted onto the bus 10 will be transferred finally and which can be addressed by the CPU 1.

The respective registers are prepared separately so as to be classified into odd-numbered field data 310, even-numbered field data 320 and compressed motion picture data 330. The register assigned to the compressed motion picture data 330 is however only one register, namely, transfer destination address register 304. The motion picture input interface portion 50 is designed to be operated in accordance with values which are set in the respective resisters in advance. The values are set in the respective registers by a program for driving the video capture device 12. The program is stored in the main storage device 2 or the auxiliary storage device 3 and executed by the CPU 1. The user can set desired values in the respective registers through the program.

The set values of the registers in the video capture device 12 and the operations of the registers will be described below with reference to FIG. 18 upon the case where the set values of the registers are as shown in FIG. 17.

Figure 18:
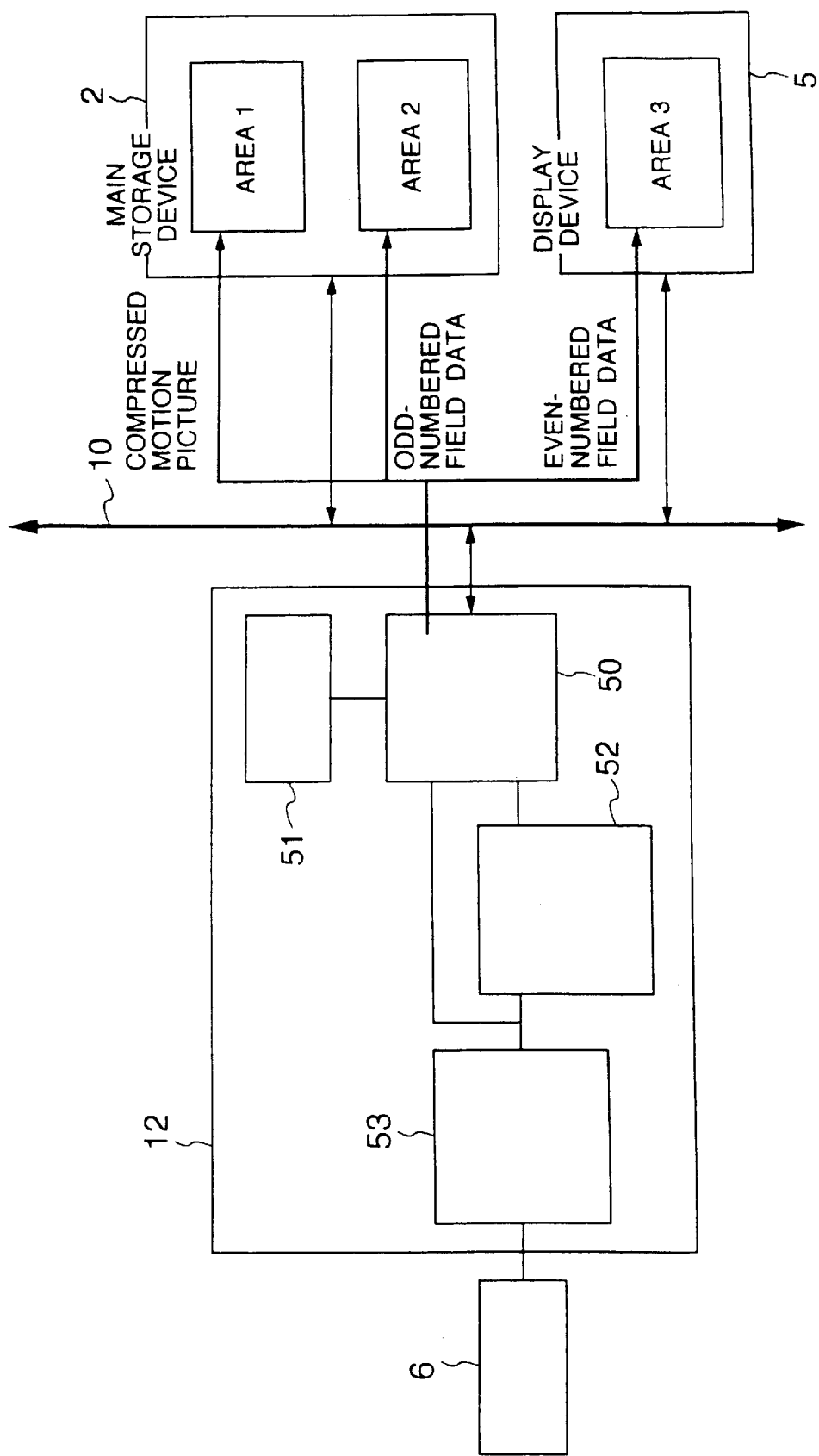
FIG. 18 is an explanatory view of the operation of the video capture device in the best-mode embodiment.

In FIG. 18, the areas 1 and 2 are areas secured separately on the main storage device 2. The area 3 is a part of VRAM (display memory) contained in a general display device. Data stored in the VRAM are designed to be displayed on a CRT, or the like. When, for example, motion pictures are to be displayed in a window, the area 3 is an area which is secured on the VRAM correspondingly to the display region of the window.

Assuming now that in FIG. 17 the register content of the transfer destination address 304 assigned to the odd-numbered field data 310, the register content of the transfer destination address 304 assigned to the even-numbered field data 320 and the register content of the transfer destination address 304 assigned to the compressed motion picture data 330 indicate the top address of the area 2, the top address of the area 3 and the top address of the area 1 respectively, then the odd-numbered field data and the compressed motion picture data are transferred to the main storage device 2 whereas the odd-numbered field data is transferred to the display device 5.

With respect to the odd-numbered field data 310, because the register content of the input resolution 301 is 640240 and the register content of the output resolution 302 is 160120, the scaling portion 63 performs scaling-down to ¼ horizontally and ½ vertically. Further, because the register content of the color format 303 is RGB24, the color conversion portion 62 converts the YUV-format data into RGB-format data so that each of R, G and B components is expressed in 8 bits. The DMA transfer control portion 61 then transfers the scaled and color-converted odd-numbered field data to the area 2 designated by the register content of the transfer destination address 304.

With respect to the even-numbered field data 320, because the register content of the input resolution 301 is 640240 and the register content of the output resolution 302 is 320240, the scaling portion 63 performs scaling-down to ½ horizontally without scaling-down/up vertically. Further, because the register content of the color format 303 is RGB8, the color conversion portion 62 converts the YUV-format data into RGB-format data so that a combination of R, G and B components is expressed in 8 bits totally. The DMA transfer control portion 61 then transfers the scaled and color-converted even-numbered field data to the area 3 designated by the register content of the transfer destination address 304.

With respect to the compressed motion picture data 330, the compressed motion picture data transmitted from the motion picture compressing portion 52 is transferred to the area 1 designated by the register content of the transfer destination address 304.

As described above, the video capture device 12 can divide motion picture data supplied from a video camera, a VTR, or the like, into odd-numbered field data and even-numbered field data and can transfer the odd-numbered field data and the even-numbered field data to different devices or areas respectively in the information processing system. At the same time, the video capture device 12 can transfer also compressed data of the input motion pictures to a different device or area in the information processing system. Furthermore, the odd-numbered field data and the even-numbered field data can be transferred after they are converted into data with different sizes and different color formats. Furthermore, the odd-numbered field data and the even-numbered field data can be transferred to the same device or area correspondingly to the set values of the registers for the transfer destination address 304. In this case, the motion picture data can be recorded or displayed just as the motion picture data have been inputted.

Figure 2:
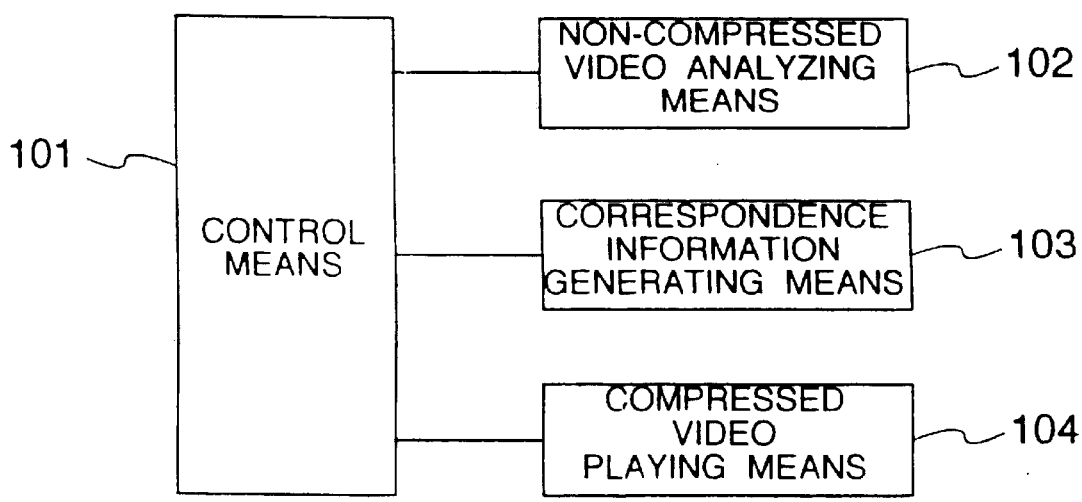
FIG. 2 is a functional block diagram of the video recording/playing apparatus in the best-mode embodiment.

FIG. 2 is a functional block diagram of the video recording/playing apparatus as a preferred embodiment of the present invention.

In FIG. 2, the reference numeral 101 designates a control means for controlling respective functional blocks in the video recording/playing apparatus as a preferred embodiment of the invention; 102, a non-compressed video analyzing means having a function of analyzing non-compressed motion pictures; 103, a correspondence information generating means having a function of generating information for associating the non-compressed motion pictures with the compressed motion pictures; and 104, a compressed video playing device having a function of playing/displaying the compressed motion pictures. The CPU 1 executes a program stored in the main storage device 2 or the auxiliary storage device 3 to thereby achieve these functional blocks.

The operation of the video recording/playing apparatus according to the present invention will be described below with reference to the drawings.

Although description will be made upon the case where MPEG is used as a compressing technique to make it possible to perform playing in a high compression ratio and in a high picture quality and where the change of a scene is used as information extracted from digitized motion pictures, the invention is not limited thereto.

Figure 3:
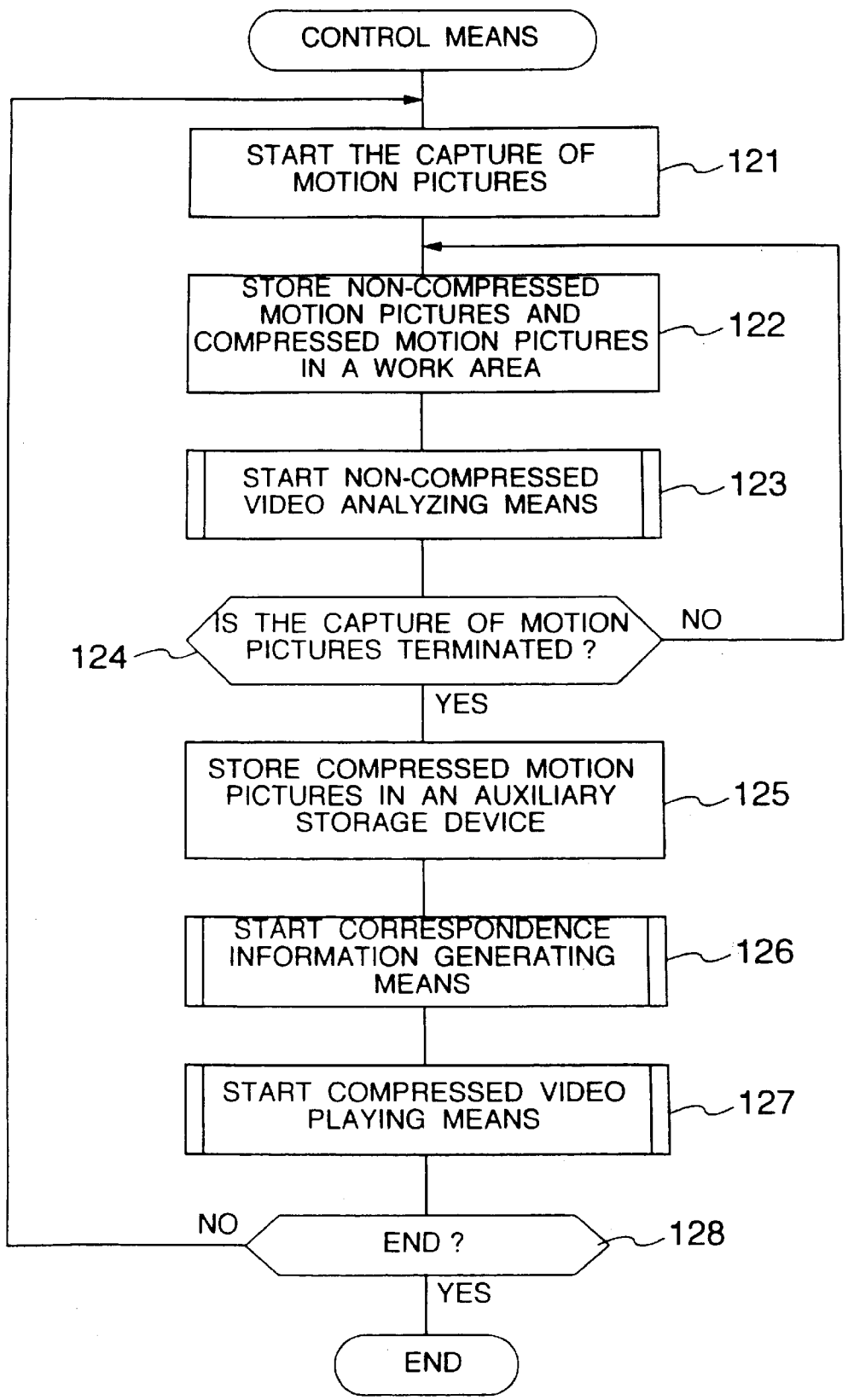
FIG. 3 is a flow chart of processing in the control means in the best-mode embodiment.

FIG. 3 is a flow chart showing the contents of processing in the control means 101. The program for carrying out this processing is stored in the main storage device 2 or the auxiliary storage device 3, so that the program is executed by the CPU 1 with some event as a turning point, that is, for example, with a user's instruction inputted through the input device 4 as a turning point.

As shown in FIG. 3, the control means 101 first starts capturing of motion pictures (step 121). specifically, the program for driving the video capture device 12 is executed to perform preparation for acquiring motion pictures such as setting of values inputted by the user through the input device 4 or the like, in the respective registers, securing of work areas on the main storage device 2, and so on. As an example for description, the set values of the registers are now assumed to be shown in FIG. 17. Accordingly, respective data are transferred as shown in FIG. 18. That is, the work areas on the main storage device 2 contain the area 1 and the area 2.

The control means 101 then acquires non-compressed motion pictures inputted through the video input device 6 and digitized by the video capture device 12 and stores the digitized non-compressed motion pictures in the area 2 (step 122). In this occasion, the data stored in the area 2 is an odd-numbered field data which is DMA-transferred by the video capture device 12 automatically. At the same time when the odd-numbered field data is transferred, a motion picture data inputted through the video input device 6 and MPEG-compressed by the video capture device 12 and an even-numbered field data are transferred to the area 1 and to the area 3 respectively.

The non-compressed video analyzing means 102 is then operated to detect whether there is any scene change or not (step 123). If the capture of motion pictures is continued, the steps 122 and 123 are repeated (step 124). The detailed contents of processing in the non-compressed video analyzing means 102 will be described later.

If the capture of motion pictures is terminated in the step 124, for example, by an instruction from the user, or the like, the motion picture data (stored in the area 1 on the main storage device 2) inputted through the video input device 6 and digitized and MPEG-compressed by the video capture device 12 is stored in the auxiliary storage device 3 (step 125). In this occasion, because compression of non-compressed motion pictures is performed in the video capture device 12 simultaneously while a process of the steps 122 to 124, that is, a non-compressed video analyzing process is carried out, there is no reduction of processing speed on the whole of the control means 101. Furthermore, because the non-compressed motion picture data captured in the step 122 is not compressed but the motion picture data supplied through the video input device 6 is compressed (while the non-compressed motion picture data is analyzed), the technique used herein is different from the aforementioned conventional technique in which non-compressed motion picture data is inputted and then compressed.

The control means 101 then operates the correspondence information generating means 103 to generate information for associating the non-compressed motion picture data at the point of time of the scene change with the compressed motion picture data at the same point of time (step 126). The detailed contents of processing in the correspondence information generating means 103 will be described later.

Finally, the compressed video playing device 104 is operated to start the reproduction/display of the aforementioned compressed motion pictures, for example, from the point of time designated by the user (step 127). If the processing in the control means 101 is continued, the situation of the routine goes back to the step 121 to repeat the processing (step 128). When, for example, there is some ending instruction, or the like, from the user, the processing in the control means 101 is terminated. The detailed contents of processing in the compressed video playing device 104 will be described later.

Figure 4:
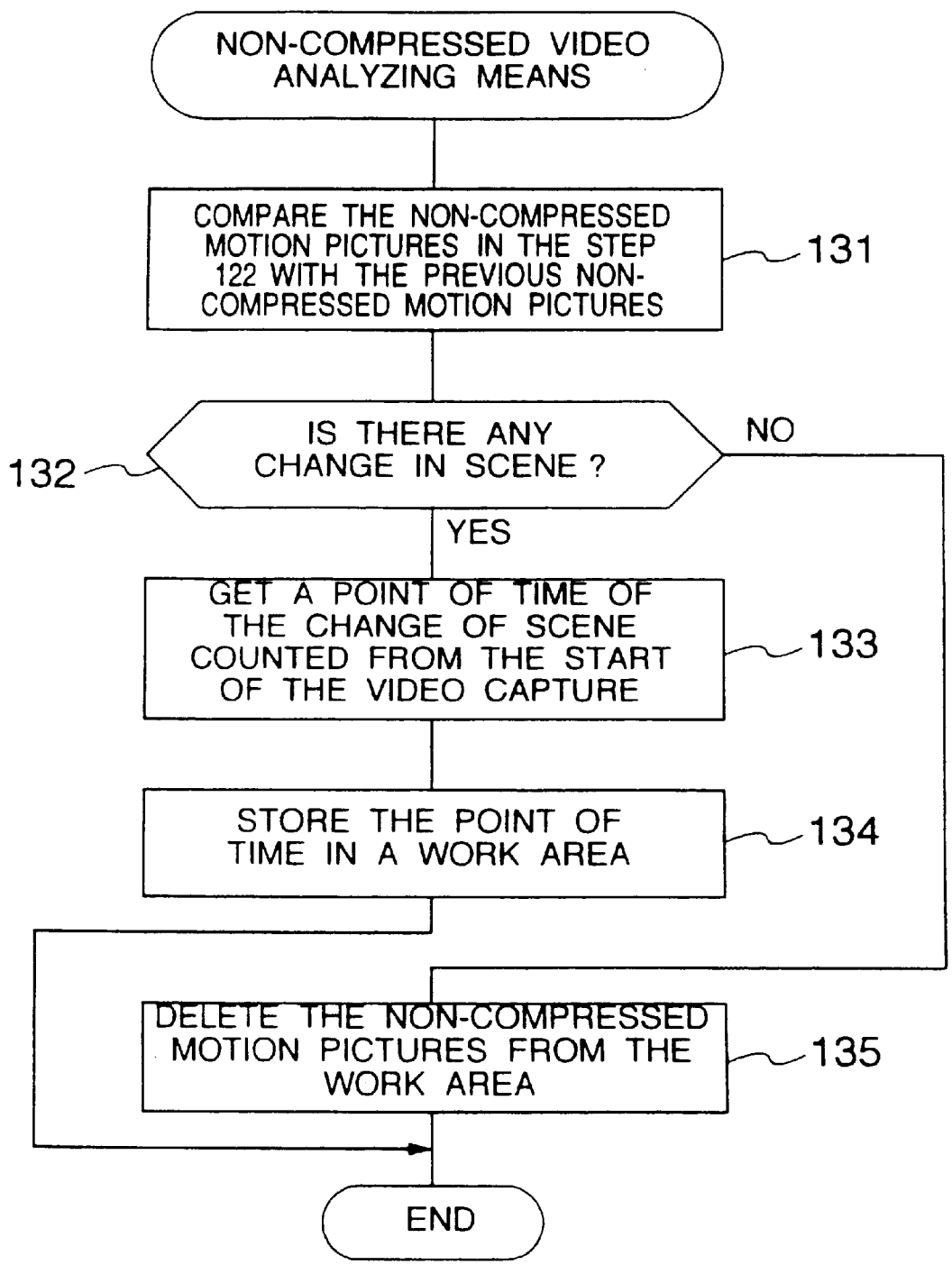
FIG. 4 is a flow chart of processing in the non-compressed video analyzing means in the best-mode embodiment.

FIG. 4 is a flow chart showing the contents of processing in the non-compressed video analyzing means 102. The program for carrying out this processing is stored in the main storage device 2 or the auxiliary storage device 3 and executed by the CPU 1.

As shown in FIG. 4, the non-compressed video analyzing means 102 compares the data of non-compressed motion pictures stored in the area 2 in the step 122 in the control means 101 with the data of non-compressed motion pictures stored previously in the area 2 in the repetition process of the steps 122 to 124 (step 131). In this occasion, similarly to the above-mentioned conventional technique differences between pixels are calculated by pixel-by-pixel comparison between the two non-compressed motion picture data, and the sum of the differences between all pixels is obtained to conduct comparison, so that a judgment is made as to whether there is any scene change or not (step 132). When the sum of the differences is larger than a predetermined threshold, a decision can be made that there is some scene change.

When a decision is made in the step 132 that there is some scene change, the point of time which is elapsed from the point of time of the start of motion picture capture and at which there is some scene change in the non-compressed motion pictures is acquired (step 133) and stored in the work area (step 134), and the processing is terminated. In this occasion, the time elapsed from the point of time of the start of motion picture capture can be acquired as follows. That is, if the aforementioned program for driving the video capture device 12 has a function of feeding back the number of still images (inclusive of the number of still images not captured because of the problem of time) captured from the point of time of the start of motion picture capture, the number of still images is acquired. If motion pictures inputted through the video input device 6 are of an NTSC format, the quotient obtained by dividing the number of still images by 30 is the point of time because the frame rate is 29.97 frame per second. In the case where the aforementioned program for driving the video capture device 12 has no function of feeding back the number of still images captured from the point of time of the start of motion picture capture, a timer at intervals of 1/29.97 sec (in the case of NTSC-format motion pictures) may be preferably started from the point of time of the start of motion picture capture so that the number of still images captured is counted.

If a decision is made in the step 132 that there is no scene change, the non-compressed motion pictures previously stored in the area 2 are deleted from the area 2 (step 135) and the processing is terminated. A specific example of the scene change will be described later.

Figure 5:
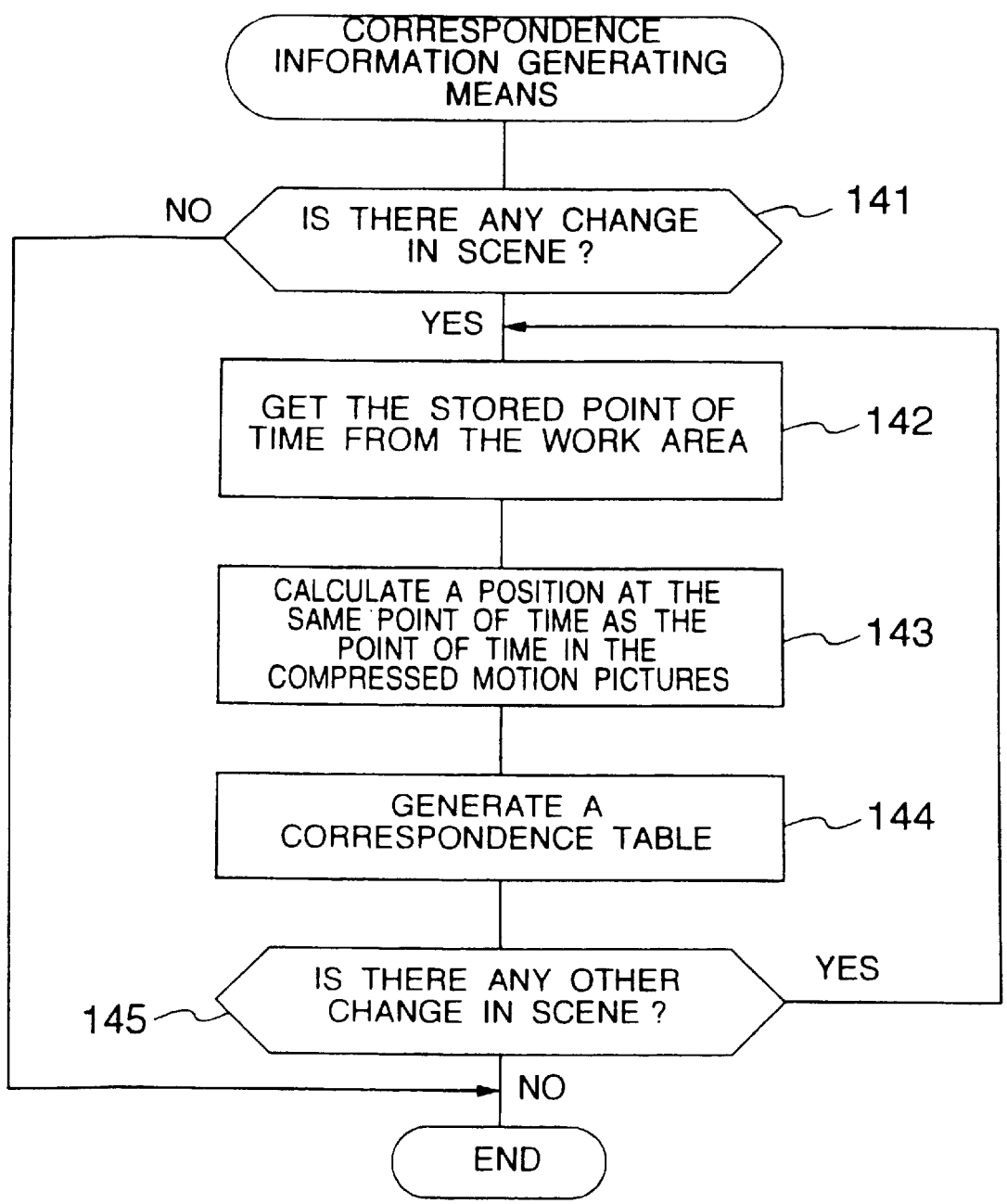
FIG. 5 is a flow chart of processing in the correspondence information generating means in the best-mode embodiment.

FIG. 5 is a flow chart showing the contents of processing in the correspondence information generating means 103. The program for carrying out this processing is stored in the main storage device 2 or the auxiliary storage device 3 and is executed by the CPU 1.

As shown in FIG. 5, the correspondence information generating means 103 first judges whether there is any scene change in capturing of a series of motion pictures or not (step 141). If there is no scene change, the processing is terminated. If a counter is provided in the processing in the non-compressed video analyzing means 102 so that the counter is incremented when the scene change is judged in the step 132 in the non-compressed video analyzing means 102, the judgment as to whether there is any scene change or not, can be made by examining whether the count value of counter provided in the processing in the non-compressed video analyzing means 102 is 1 or more.

If a decision is made in the step 141 that there is some scene change, only one of the points of time stored in the non-compressed video analyzing means 102 in the step 134 is acquired from the work area (step 142), and the still image (position) at the point of time the same as the point of time in the MPEG-compressed motion pictures stored in the auxiliary storage device 3 in the step 125 are calculated (step 143). The calculating method in this occasion will be described with reference to FIGS. 6a through 6c.

Figure 6A:
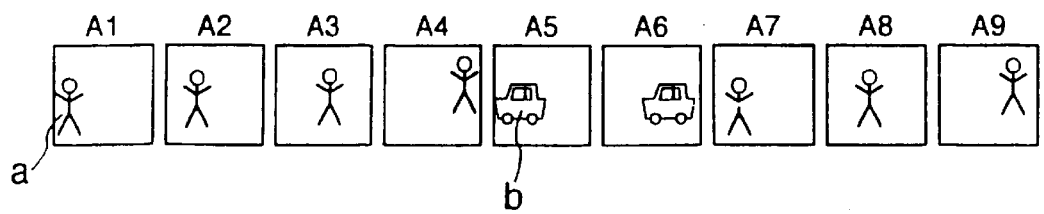
FIG. 6A, FIG. 6B and FIG. 6C are explanatory views showing a method of generating correspondence information.

FIG. 6a is a view showing a state in which a part of non-compressed motion pictures captured in the step 122 in the control means 101 are arranged in a time series sequence as an example upon the assumption that time advances from the left to the right in the drawing. That is, A1 is the earliest captured still image of non-compressed still images A1 to A9. further, the still images A1 to A4 show information concerning the movement of an object a, so that the still images A1 to A4 are considered to be in the same scene. When the still image A4 is changed to the still image A5, the object a however disappears from the scene and a new object b appears in the still image A5. This is considered to be a scene change. Similarly, there is a scene change between the still images A6 and A7. That is, in the step 132 in the non-compressed video analyzing means 102, scene changes are judged when the still images A5 and A7 are analyzed.

Figure 6B:
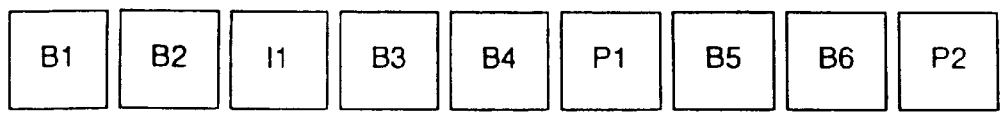

FIG. 6b is a view showing a state in which a part of MPEG compressed motion pictures captured in the step 125 in the control means 101 are arranged in a time series sequence (a sequence of original images) upon the assumption that time advances from the left to the right in the drawing. That is, B1 is the earliest captured MPEG-encoded image of compressed still images B1 to P2. Further, the images B1, B2, I1, B3, B4, P1, B5, B6 and P2 are coincident with the images A1, A2, A3, A4, A5, A6, A7, A8 and A9 respectively in terms of time. Because the non-compressed images and the compressed images are based on the same motion picture data inputted through the video input device 6, for example, the data of A1 is coincident with the data obtained by decoding B1. Here, I, P and B show an I picture, a P picture and a B picture, respectively, in MPEG. The practical encoding method has been described in detail in "Illustrated Up-to-date MPEG Textbook", pp.89–165, edited by the Multimedia Communication Research Group, ASCII Corp.

Figure 6C:
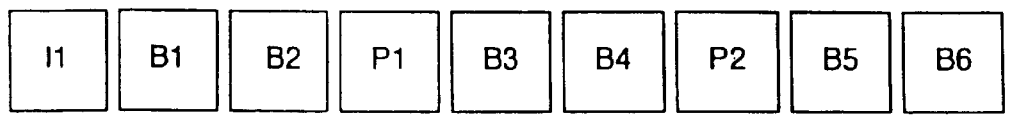

FIG. 6c is a view showing a state in which a part of MPEG-compressed motion pictures captured in the step 125 in the control means 101 are arranged in a sequence (bit-streaming sequence) of data actually stored in the auxiliary storage device 3. In FIGS. 6b and 6c, identical numerals refer to identical parts. Accordingly, the first data B1 in FIG. 6b and the second data B1 in FIG. 6c are data of one and the same content. Further, I1 is assumed to be the top of GOP.

If a point of time acquired in the step 142 is the point of time (which is assumed to be T1) of the capturing of the non-compressed image A5, the position of B4 is calculated in the step 143 because B4 is an image at the same point of time as T1 in the MPEG-compressed motion pictures. The calculating method will be described below.

Header information is stored in the top of each GOP in an MPEG bit stream, so that the header information contains a point of time (which is assumed to be TC) of the top image of the GOP measured from the top of the bit stream. Accordingly, a GOP (assumed to be G1) containing T1 can be specified by examining TC in each GOP. That is, the point of time of B1 in the MPEG bit stream (G1) in FIG. 6c is TC. Further, the header information contains the frame rate (assumed to be PR) of motion pictures. Further, each image stores header information which contains the frame number (assumed to be TR) of the image measured from the top of the GOP (Group Of Picture: a structure for random access of an MPEG bit stream) containing the image. Accordingly, a result obtained by multiplying PR (Picture Rate: a period of displaying images in a sequence layer) and TR (Temporal Reference: a remainder obtained by dividing the serial number of a picture in a picture layer by 1024 so as to be reset by the top of the GOP) is the point of time (assumed to be T2) measured from the top of G1. The point of time T2 can be calculated by searching for the image (B4) having the relation TC+T2=T1. Although the above description concerns video data, information concerning audio data can be calculated in the same manner as the information concerning video data.

Further, reproduction in the middle of the GOP or from the B picture may be impossible when the ability of the compressed video playing device 104 which will be described later is insufficient. It can be therefore thought of that B4 is replaced by B1 or I1 in the top of the GOP, P1 near B4, or the like.

Referring back to FIG. 5, the correspondence information generating means 103 then generates a correspondence table 200 shown in FIG. 7 on the basis of various information calculated in the step 143 (step 144). If the correspondence table 200 has been already generated, entries are added to the correspondence table 200.

FIG. 7 shows the contents of the correspondence table 200. The correspondence table 200 serves to associate non-compressed images and compressed images with each other and is stored in the main storage device 2 or the auxiliary storage device 3. Further, because the header information stored in the top of each GOP contains a free information storage area as a user data area, it can be thought of that the correspondence table 200 is stored in the area.

The correspondence table 200 has respective items of ID 210, non-compressed image pointer 220, compressed file name 230, time code 240 and index 250. For example, the correspondence table 200 is constituted by data sets each given to an image just after or near a scene change correspondingly to the aforementioned items. Further, in the case where the correspondence table 200 is stored in the user data area, the correspondence table 200 may be formed to have at least the items of non-compressed image pointer 220 and index 250.

Identifiers given to scene changes respectively are set in the ID 210. The identifiers are numerical data given peculiarly in this video recording/playing apparatus. Pointers indicating non-compressed images stored in the main storage device 2 (stored in the step 122 in the control means 101) are set in the non-compressed image pointer 220. Any data such as comments inputted by the user, or the like, can be used as the contents of the non-compressed image pointer 220 if scene changes can be specified by the data. The file names of compressed motion pictures stored in the auxiliary storage device 3 in the step 125 in the control means 101 are set in the compressed file name 230. Points of time for the respective first images of GOPs which exist in header information of the GOPs containing scene-changed images and which are measured from the top of the bit stream, are stored in the time code 240. This is equivalent to TC as described above. Indeces (frame numbers) of the scene-changed images in the GOP are set in the index 250 (the indeces are numbered from zero).

For example, in the example of FIGS. 6a to 6c, a correspondence table 200' is generated as shown in FIG. 8. In FIG. 8, the reference numerals 301 and 302 designate data sets given to images A5 and A7 just after scene changes respectively in FIG. 6a. In the data set 301, the set value of the non-compressed image pointer 220 is the address on the main storage device 2 of the non-compressed image A5 stored in the main storage device 2. In the data set 302, the set value of the non-compressed image pointer 220 is the address on the main storage device 2 of the non-compressed image A7 stored in the main storage device 2.

Referring back to FIG. 5, the correspondence information generating means 103 finally turns the situation of the routine back to the step 142 to repeat the processing when there is another scene change (step 145). If there is no more scene change, the processing is terminated. The judgment as to whether there is any more scene change or not, is based on examination of the aforementioned counter.

Figure 9:
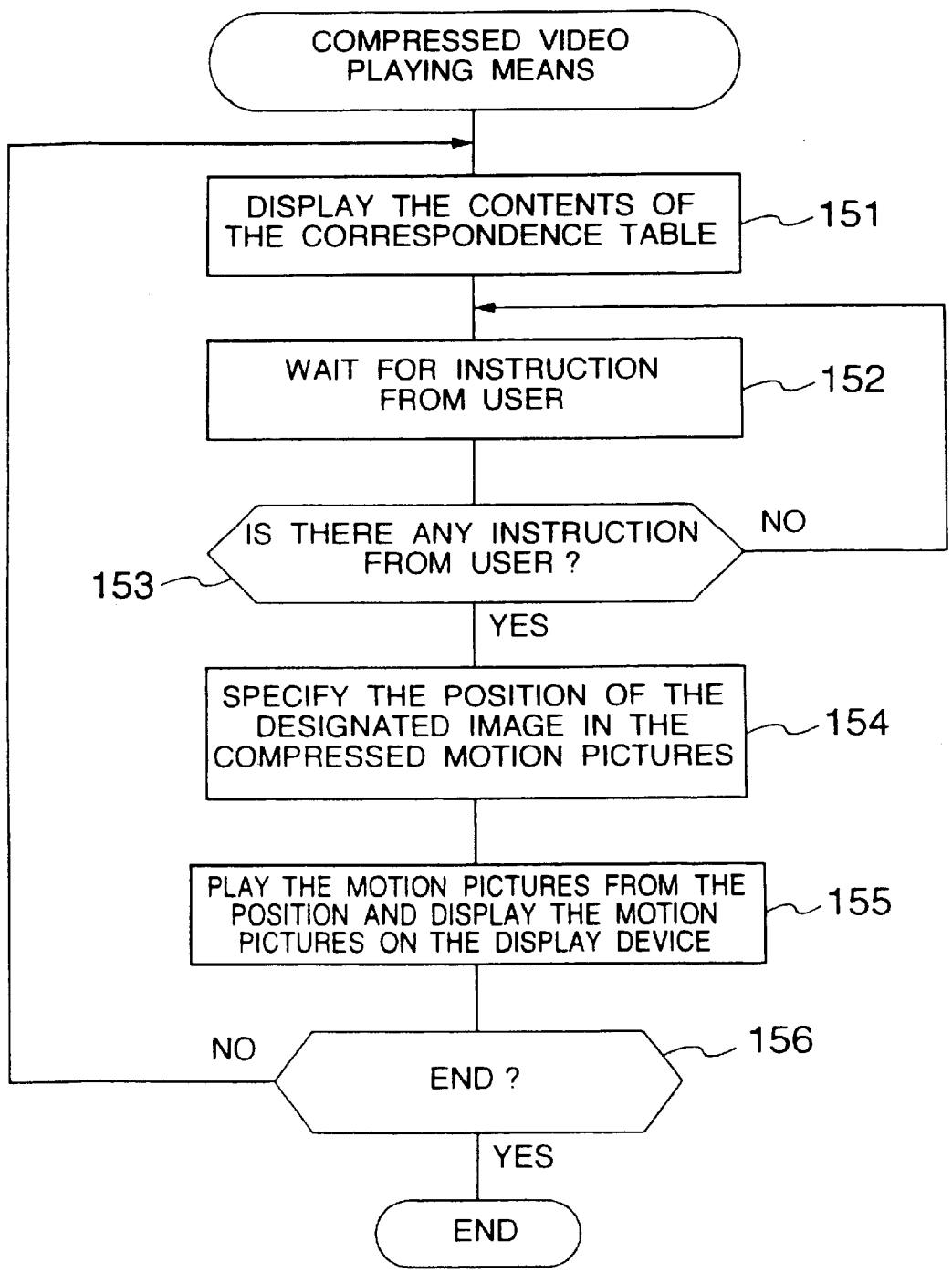
FIG. 9 is a flow chart of processing in the compressed video playing device in the best-mode embodiment.
Figure 10:
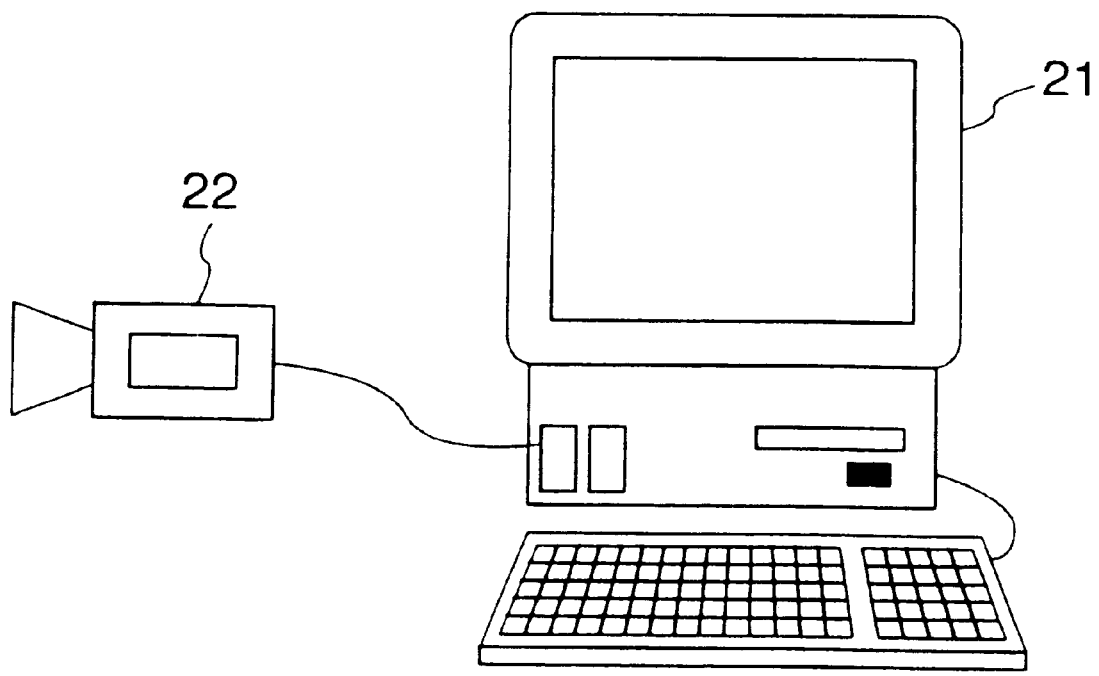
FIG. 10 is a configuration diagram of a video recording/playing apparatus according to a conventional technique.
Figure 11:
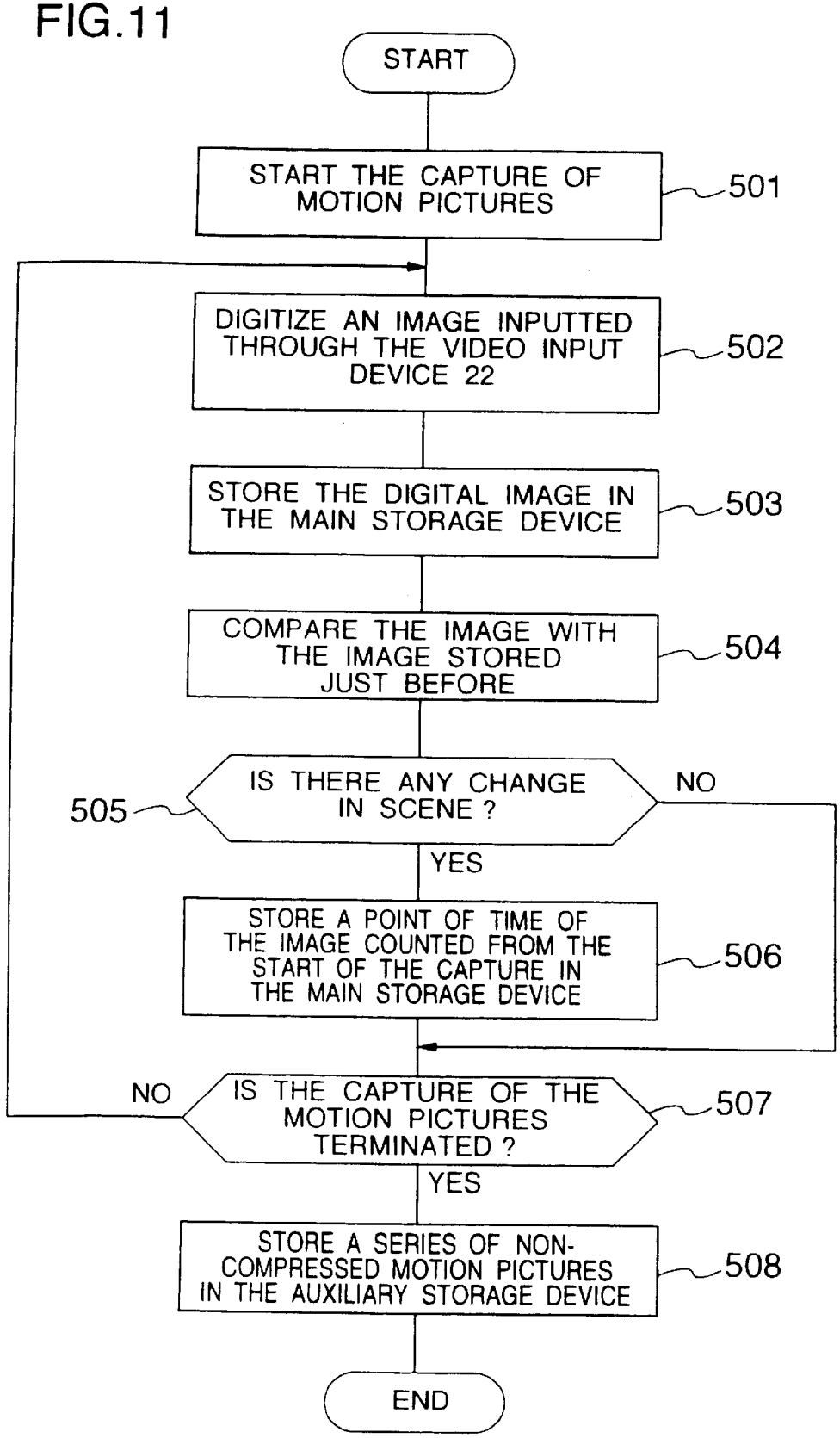
FIG. 11 is a flow chart of processing in the video recording/playing apparatus according to the conventional technique.

FIG. 9 is a flow chart showing the contents of processing in the compressed video playing device 104. The program for carrying out this processing is stored in the main storage device 2 or the auxiliary storage device 3 and is executed by the CPU 1.

As shown in FIG. 9, the compressed video playing device 104 first lists various kinds of information on the display device 5 in accordance with the contents of the correspondence table 200 generated by the correspondence information generating means 103 (step 151). In this occasion, the contents of the ID 210 in the correspondence table 200 and non-compressed images pointed by the non-compressed image pointer 220 are displayed. Further, the compressed file name 230 in the correspondence table 200 may be displayed together with these pieces of information. For example, FIG. 19 shows an example of display on the display device 5 in the step 151.

Figure 19:
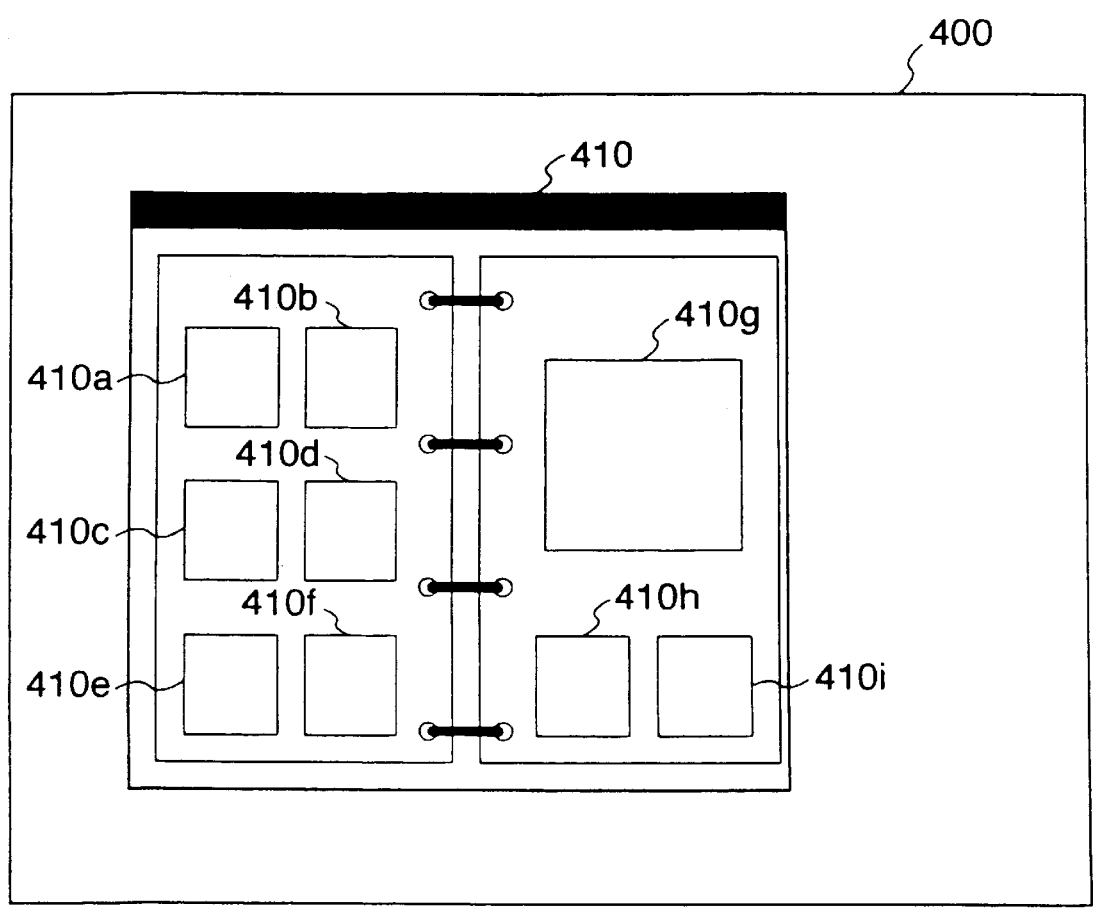
FIG. 19 is a view showing an example of the display configuration at the time of reproduction of compressed motion pictures in the best-mode embodiment.

In FIG. 19, the reference numeral 400 designates a display screen contained in the display device 5; 410, a window for displaying the contents of the correspondence table 200; and 410a to 410i, non-compressed images pointed by the non-compressed image pointer 220 in the correspondence table 200 and stored in the main storage device 2. In this case, the correspondence table 200 has at least nine entries.

Referring back to FIG. 9, the compressed video playing device 104 waits for an instruction from the user (step 152) and stands by for the instruction from the user (step 153). When there is some instruction (to select one non-compressed image from the non-compressed images (410a to 410i) listed in the step 151) from the user in this occasion, a position (reproduction start position) corresponding to the instructed non-compressed image is specified in the compressed motion pictures (step 154). This processing can be carried out as follows.

First, the correspondence table 200 is searched with the ID (the data of the ID 210 in the correspondence table 200) of the designated non-compressed image as a keyword. As a result, a data set having the ID can be retrieved. The data of the compressed file name 230, the data of the time code 240 and the data of the index 250 are extracted from the data set to thereby make it possible to specify the playing position.

Then, the compressed video playing device 104 reproduces the compressed motion pictures indicated by the data of the compressed file name 230 from the playing position and displays the reproduced motion pictures on the display device 5 (step 155). The method for reproducing the compressed motion pictures and displaying the reproduced motion pictures on the display device 5 after the settlement of the playing position is well-known so that the detailed description thereof will be omitted. For example, FIG. 20 shows an example of display on the display device 5 in the step 155.

Figure 20:
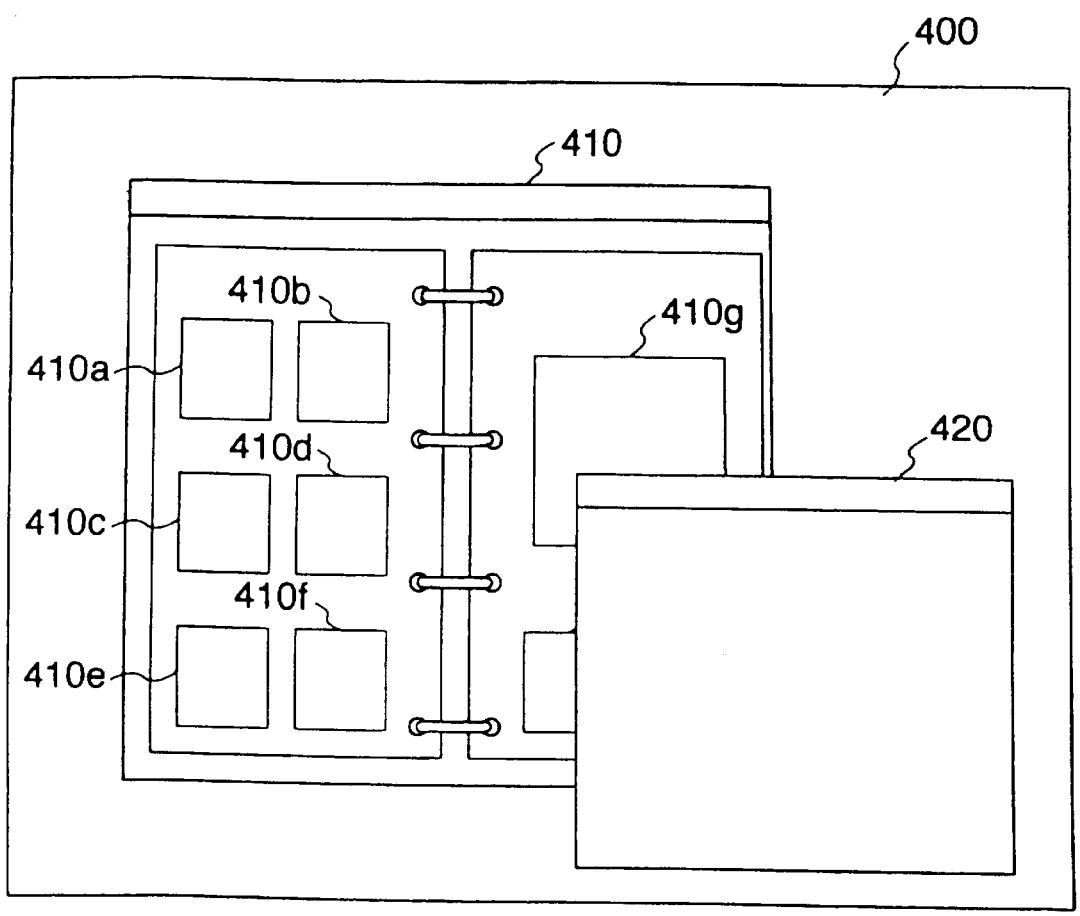
FIG. 20 is a view showing an example of the display configuration at the time of reproduction of compressed motion pictures in the best-mode embodiment.

In FIG. 20, the reference numeral 420 designates a window for reproducing/displaying the compressed motion pictures indicated by the data of the compressed file name 230 from the playing position.

Finally, if the processing in the compressed video playing device 104 is continued, the situation of the routine goes back to the step 151 to repeat the processing (step 156). When, for example, there is an ending instruction, or the like, from the user in the step 156, the processing in the compressed video playing device 104 is terminated.

As described above, according to the present invention, because scene changes, or the like, can be detected while compressed motion pictures are recorded so that motion picture data can be associated with the scene-change points in the compressed motion pictures, a video recording/playing apparatus for recording/playing motion pictures easily can be provided.

Furthermore, according to the present invention, there can be provided a video recording/playing apparatus in which: non-compressed motion pictures and compressed motion pictures can be captured (recorded) simultaneously in an information processing system; analysis is made by using non-compressed motion pictures so that an arbitrary image corresponding to an arbitrary image in the non-compressed motion pictures can be specified in the compressed motion pictures; and these two images are associated with each other so that the head-review playing of the compressed motion pictures can be started easily from the position designated by the user, or the like.

Furthermore, according to the present invention, there can be provided a video recording/playing apparatus in which compressed motion pictures are captured preferentially when the non-compressed motion pictures and compressed motion pictures are captured simultaneously in the information processing system.

Furthermore, according to the present invention, there can be provided a video recording/playing system such as a motion picture album for generating information for associating non-compressed motion pictures with compressed motion pictures on the basis of the non-compressed motion pictures in the middle of the recording of the non-compressed motion pictures or after the recording of the non-compressed motion pictures and for playing the compressed motion pictures on the basis of the relating information.

Furthermore, according to the present invention, because not only non-compressed motion pictures can be separated into odd-numbered field data and even-numbered field data in an interlace signal when the non-compressed motion pictures are captured in the information processing system but also the odd-numbered field data and the even-numbered field data with the same size and same color format or with different sizes and different color formats can be transferred to the same area/device or different areas/devices, there can be provided a video recording/playing apparatus in which scene changes can be detected while input motion pictures are monitored, for example, by a display device contained in the information processing system.

Although this embodiment has shown the case where scene changes are used as information extracted from the non-compressed motion pictures, the present invention can be applied to the case where another information is used. When, for example, image information to be detected is designated by the user in advance so that an image consistent with the image information is recognized by the non-compressed video analyzing means 102, a simple motion picture retrieval system can be constructed.

Figure 21:
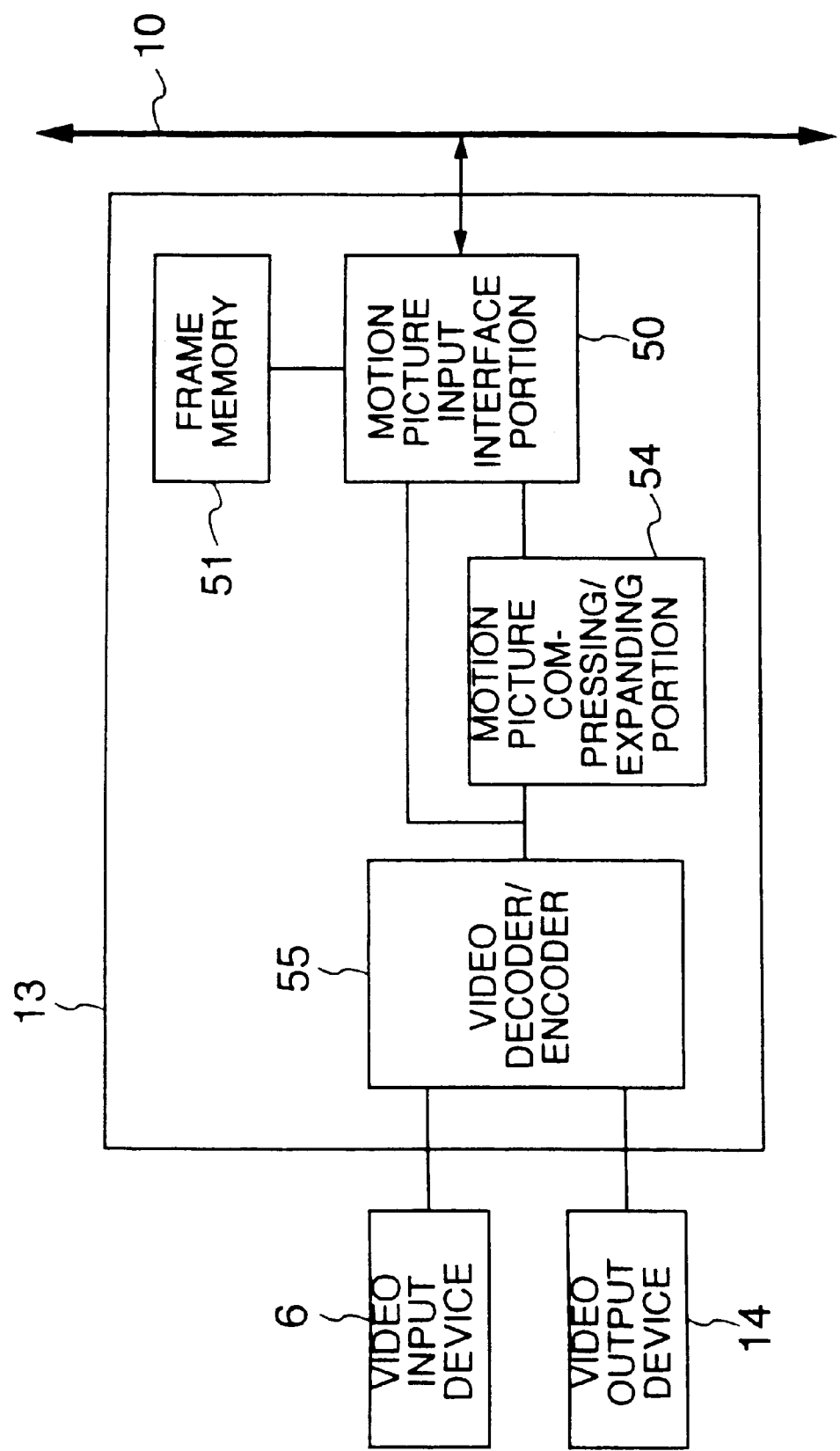
FIG. 21 is a hardware configuration diagram of the video capture device in the best-mode embodiment.

Although the above description has been made upon the case where the video capture device 12 and the compressed video playing device 9 are formed as different devices, the present invention may be applied to the case where the compressed video playing device 9 is formed as a video capture/playing device 13 including the video capture device 12. FIG. 21 is a block diagram of the video capture/playing device 13 in this case.

As shown in FIG. 21, the video capture/playing device 13 has a motion picture input interface portion 50, a frame memory 51, a motion picture compressing/expanding portion 54, and a video decoder/encoder 55.

The video decoder/encoder 55 which is connected to the video input device 6, digitizes analog motion pictures inputted through the video input device 6 and outputs the digitized motion pictures. When, for example, the analog motion pictures inputted through the video input device 6 are formed from an NTSC-format signal, the video decoder/encoder 55 can be provided as an NTSC decoder. In this case, odd-numbered field signals and even-numbered field signals in an NTSC-format interlace signal are digitized and outputted in a time series sequence. The output motion pictures of the video decoder/encoder 55 are inputted to the motion picture compressing/expanding portion 54 and to the motion picture input interface portion 50 simultaneously.

Further, a video output device 14 achieved by a TV monitor, a VTR, or the like, is connected to the video decoder/encoder 55, so that motion pictures expanded by the video compressing/expanding portion 54 and data held in the main storage device 2, the auxiliary storage device 3 or the display device 5 in the information processing system are outputted from the video encoder/decoder 55 to the video output device 14. In this occasion, if the video output device 14 is a device using an NTSC-format signal, the data to be outputted to the video output device 14 is converted into an NTSC-format signal. Alternatively, the video decoder/encoder 55 may be separated into a video decoder and a video encoder to be provided separately.

The video compressing/expanding portion 54 compresses digitized motion pictures outputted from the video decoder/encoder 55 by using a compressing technique such as MPEG, or the like, and outputs the compressed motion pictures to the motion picture input interface portion 50. Further, the video compressing/expanding portion 54 expands compressed motion pictures given through the motion picture input interface portion 50 and outputs the expanded motion pictures to the video decoder/encoder 55 and/or the video signal input/output portion 64 (see FIG. 16) of the motion picture input interface portion 50. As described above, the motion pictures outputted to the video signal input/output portion 64 of the motion picture input interface portion 50 are DMA-transferred to the main storage device 2, the auxiliary storage device 3 or the display device 5.

The flame memory 51 and the motion picture input interface portion 50 are formed in the same manner as in FIG. 14.

A second embodiment of the present invention will be described below with reference to the drawings.

Figure 1:
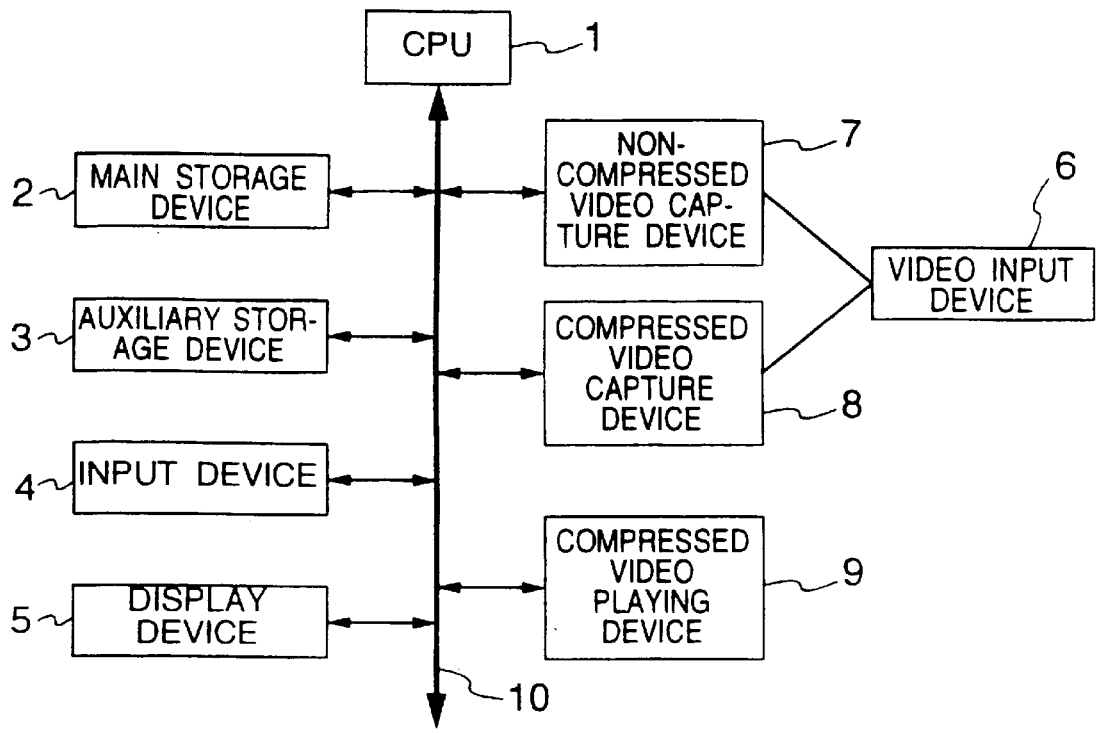
FIG. 1 is a hardware configuration diagram of a video recording/playing apparatus in a second embodiment.

FIG. 1 is a hardware configuration diagram of an information processing system such as a personal computer, or the like, to which a video recording/playing apparatus as a second embodiment of the present invention is applied.

As shown in FIG. 1, the apparatus comprises a CPU 1, a main storage device 2, an auxiliary storage device 3, an input device 4, a display device 5, a video input device 6, a non-compressed video capture device 7, a compressed video capture device 8, and a compressed video playing device 9. The respective constituent elements except the video input device 6 are connected by a bus 10 so that necessary information can be transmitted between the respective constituent elements.

On the other hand, the video input device 6 is connected both to the non-compressed video capture device 7 and to the compressed video capture device 8 so that one and the same information can be transmitted from the video input device 6 to the non-compressed video capture device 7 and the compressed video capture device 8 simultaneously.

Functional blocks of the video recording/playing apparatus in the second embodiment are as shown in FIG. 2 which is a functional block showing the preferred embodiment.

Non-compressed motion pictures are captured through the non-compressed video capture device 7 and compressed motion pictures are captured through the compressed video capture device 8. Because the non-compressed video capture device 7 and the compressed video capture device 8 are both connected to the video input device 6 so that one and the same (video) information is inputted to the two devices, the processing in the second embodiment is substantially equivalent to the processing in the preferred embodiment.

If the non-compressed video capture device 7 is formed by removing the video compressing portion 52 from the configuration of the video capture device 12, the same function as in the preferred embodiment can be achieved. Further, because the non-compressed video capture device 7 is provided so as to be separate from the compressed video capture device 8, there can be provided a video recording/playing apparatus relatively high in the degree of freedom in system construction.

A third embodiment of the present invention will be described below with reference to the drawings.

Although the first or second embodiment has shown the case where non-compressed motion pictures and compressed motion pictures are captured in real time and simultaneously, the present invention may be applied to the case where only non-compressed motion pictures are captured in real time so that the non-compressed motion pictures used for detection of scene changes are compressed while the scene changes are detected. In this case, the hardware configuration of the information processing system to which the video recording apparatus can be applied may be made as shown in FIG. 12 and the control means 101 may be changed (to the control means 101') as shown in FIG. 13.

Figure 12:
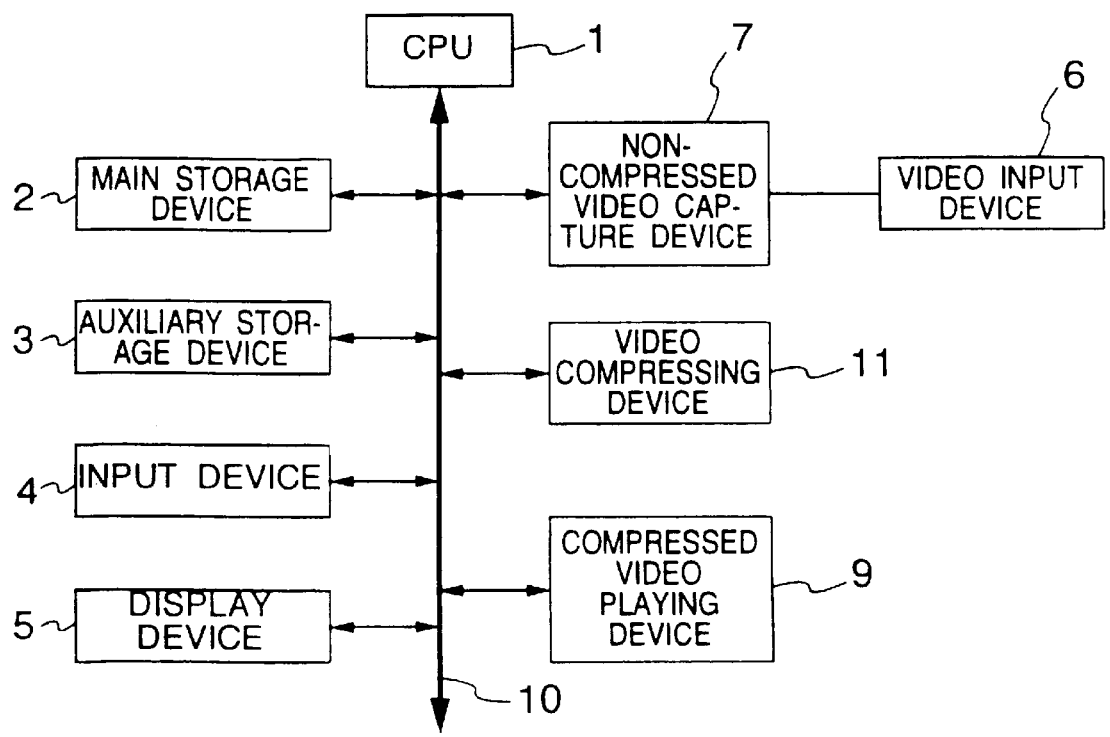
FIG. 12 is a hardware configuration diagram of the video recording/playing apparatus according to a third embodiment.

In FIG. 12, constituent elements except the video compressing device 11 are formed in the same manner as the constituent elements shown in FIG. 1. The video compressing device is a device for compressing non-compressed motion pictures given from the CPU 1, for example, by MPEG compression and storing the compressed motion pictures in the main storage device 2 or the auxiliary storage device 3.

Figure 13:
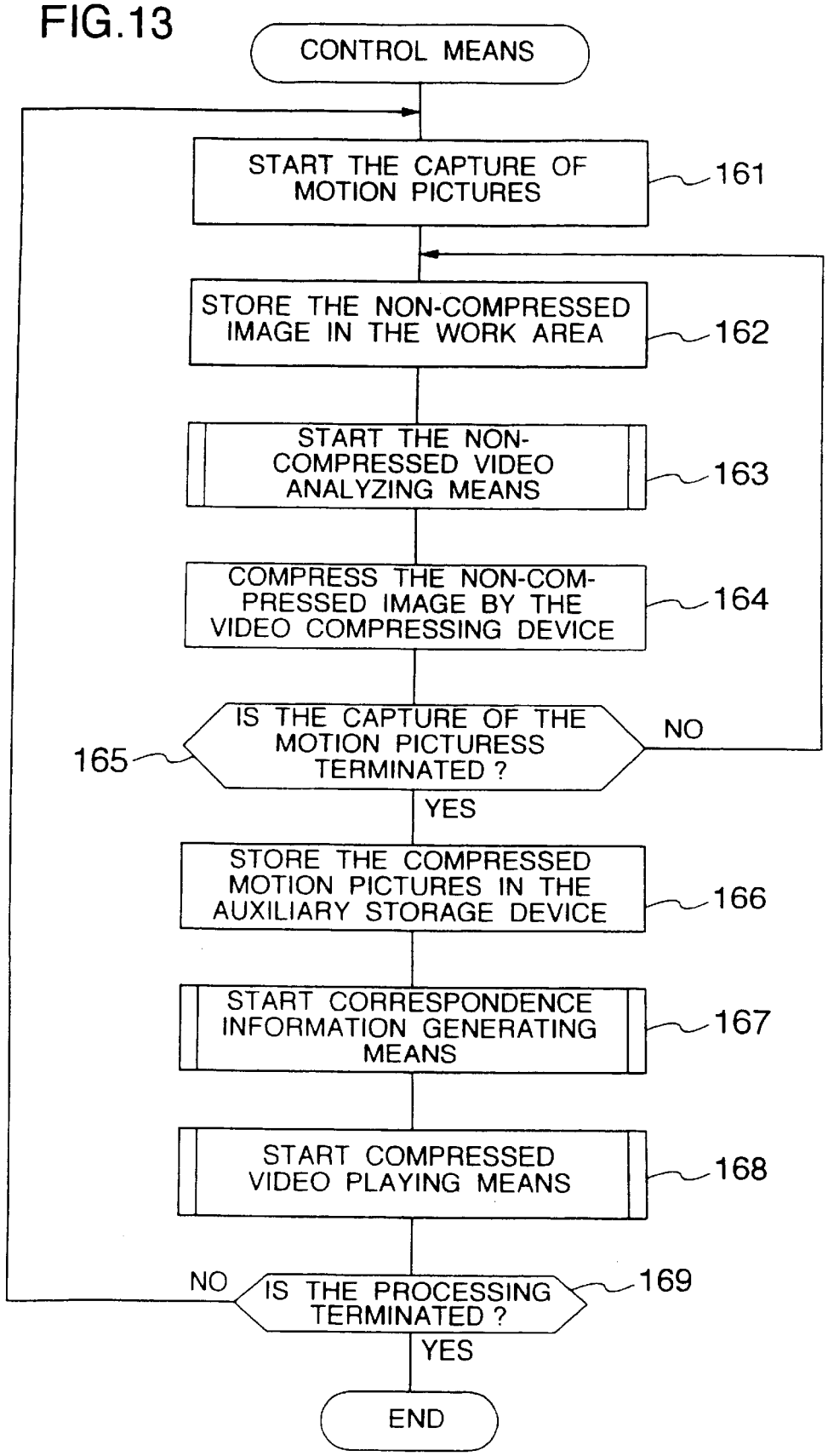
FIG. 13 is a flow chart of processing in the control means in the third embodiment.

As shown in FIG. 13, the control means 101' first starts the capture of motion pictures (step 161). Specifically, respective programs for driving the non-compressed video capture device 7 are executed to make preparation for acquiring motion pictures such as securing of a work area on the main storage device 2, or the like.

The control means 101' then acquires the non-compressed motion pictures inputted through the video input device 6 and digitized by the non-compressed video capture device 7 and stores the non-compressed motion pictures in the work area (step 162). Then, the non-compressed video analyzing means 102 is operated to detect whether there is any scene change or not (step 163). Further, the non-compressed motion pictures stored in the work area are compressed by using the video compressing device 11 (step 164). If the capture of the motion pictures is continued, the steps 162 and 164 are repeated (step 165).

If the capture of the motion pictures is terminated in the step 165, for example, on the basis of an instruction from the user, or the like, the motion pictures MPEG-compressed by the video compressing device 11 are acquired and stored in the work area or the auxiliary storage device 3 (step 166).

The control means 101' then operates the correspondence information generating means 103 to generate information for associating non-compressed motion pictures at a scene-changed point of time with compressed motion pictures at the same point of time (step 167).

Finally, the compressed video playing device 104 is operated to start reproduction/display of the compressed motion pictures, for example, from the point of time designated by the user (step 168). If the processing in the control means 101' is continued, the situation of the routine goes back to the step 161 to repeat the processing (step 169). When, for example, there is any ending instruction, or the like, from the user, the processing in the control means 101' is terminated.

As described above, in the third embodiment, when, for example, data inputted through the video input device 6 is separated into odd-numbered field data and even-numbered field data by the non-compressed video capture device 7 so that not only the odd-numbered field data with a YUV color format is transferred to the main storage device 2 whereas the even-numbered field data is converted into data with a color format capable of being displayed on the display device 5 and the data with the color format is transferred to the display device 5 but also the odd-numbered field data with the YUV format is inputted to the video compressing device 11 and compressed by the video compressing device 11, there can be provided a video recording/playing apparatus at a relatively low cost.

A conventional technique can be applied to the video compressing device 11 and, in most cases, the video compressing device 11 according to the conventional technique generally receives YUV-format data. Furthermore, if the video compressing device 11 is provided as a software device, the function of transferring the YUV color format data to the main storage device 2 while displaying non-compressed motion pictures on the display device 5 is very effective.

INDUSTRIAL APPLICABILITY

According to the present invention, there can be provided a video recording/playing apparatus in which: non-compressed motion pictures and compressed motion pictures can be captured (recorded) simultaneously in an information processing system; analysis is made by using the non-compressed motion pictures, so that an arbitrary image corresponding to an arbitrary image in the non-compressed motion pictures can be specified in the compressed motion pictures; and these two images are associated with each other to thereby facilitate head-review playing of the compressed motion pictures from a position designated by a user, or the like.

Furthermore, there can be provided a video recording/playing apparatus in which compressed motion pictures are captured preferentially when motion pictures inputted through the video input device are captured in the information processing system in real time and simultaneously as non-compressed motion pictures and as motion pictures compressed by such a compressing technique in which the compressed motion pictures in a relatively high compression ratio can be played in a high picture quality.

Furthermore, there can be provided a video recording/playing apparatus in which, when the non-compressed motion pictures are captured in the information processing system, odd-numbered field data and even-numbered field data in an interlace signal inputted through the video input device are converted into data of the same size and the same color format or of different sizes and different color formats and then transferred to the same area/device or different areas/devices to thereby perform recording of the motion pictures while monitoring the motion pictures inputted through the video input device on the display device contained in the information processing system.

What is claimed is:

1. A video capture device for processing a video input signal comprising:

a video input circuit adapted to receive a video input signal and to output odd-numbered field signals and even-numbered field signals of an interlace signal;

a color format register adapted to store color format data;

a color processing unit adapted to carry out data processing of said odd-numbered field signals and said even-numbered field signals of said interlace signal; and a transfer control circuit adapted to transfer said odd-numbered field signals and said even-numbered field signals to external devices, wherein an odd-numbered field color format data and an even-numbered field color format data, those are held in said color format register, may be different color format data values, wherein said color processing unit is adapted to output said odd-numbered field signals the color format of which is specified by said odd-numbered field color format data held in said color format register and said even-numbered field signals the color format of which is specified by said even-numbered field color format data held in said color format register;

wherein said transfer control circuit is adapted to transfer said odd-numbered field signals of said color format which is specified by said odd-numbered field color format data to one of said external devices that is specified by a first transfer destination address supplied to said video capture device and transfer said even-numbered field signals of said color format which are specified by said even-numbered field color format data to another of said external devices that is specified by a second transfer destination address supplied to said video capture device; and wherein said first transfer destination address and said second transfer destination address may be different address values.

2. A video capture device according to claim 1, further comprising:

a scaling register adapted to hold one of a plurality of scaling data values for each of said odd-numbered fields data and said even-numbered field signals, an odd-numbered field scaling data held in said scaling register being for said odd-numbered fields data and an even-numbered field scaling data held in said scaling register being for said even-numbered fields data, whereby said odd-numbered field scaling data and said even-numbered field scaling data, that are held in said scaling register, may be different scaling data values;

wherein said color processing unit is adapted to output said odd-numbered field signals the resolution of which is specified by said odd-numbered field scaling data stored in said scaling register and said even-numbered field signals the resolution of which is specified by said even-numbered field scaling data stored in said scaling register; and wherein said data control circuit is adapted to transfer said odd-numbered field signals of said resolution which is specified by said odd-numbered field scaling data to one of said external devices that is specified by a first transfer destination address supplied to said video capture device and transfer said even-numbered field signals of said resolution which specified by said even-numbered field scaling data to another of said external devices that is specified by a second transfer destination address supplied to said video capture device.

3. A video capture device according to claim 1, wherein said video input circuit converts said video input signal of an analog signal into said odd-numbered field signals and said even-numbered signals of the interlace signal that are digitized.

4. A video capture device according to claim 2, wherein said video input circuit converts said video input signal of an analog signal into said odd-numbered field signals and said even-numbered signals of the interlace signal that are digitized.

5. A video capture device according to claim 1, wherein each of said color format which is specified by said odd-numbered field color format data and said color format which is specified by said even-numbered field color format data can be arbitrarily set to any one selected from the YUV format and the RGB format.

6. A video capture device according to claim 2, wherein each of said color format which is specified by said odd-numbered field color format data and said color format which is specified by said even-numbered field color format data can be arbitrarily set to any one selected from the YUV format and the RGB format.

7. A video capture device according to claim 3, wherein each of said color format which is specified by said odd-numbered field color format data and said color format which is specified by said even-numbered field color format data can be arbitrarily set to any one selected from the YUV format and the RGB format.

8. A video capture device according to claim 4, wherein each of said color format which is specified by said odd-numbered field color format data and said color format which is specified by said even-numbered field color format data can be arbitrarily set to any one selected from the YUV format and the RGB format.

9. A video capture device according to claim 1, wherein said transfer control circuit is adapted to transfer each of said odd-numbered field signals and said even-numbered field signals to said external devices in a DMA mode,
wherein said external devices, which are supplied with said odd-numbered field signals and said even-numbered field signals in said DMA mode, comprise a main storage device and a display device in an information processing system,
wherein said main storage is adapted to receive either ones of said odd-numbered field signals said color format of which is specified by said odd-numbered field color format data held in said color format register and said even-numbered field signals said color format of which is specified by said even-numbered field color format data held in said color format register, and
wherein said display device is adapted to receive the others of said odd-numbered field signals said color format of which is specified by said odd-numbered field color format data held in said color format register and said even-numbered field signals said color format of which is specified by said even-numbered field color format data held in said color format register.

10. A video capture device according to claim 2, wherein said transfer control circuit is adapted to transfer each of said odd-numbered field signals and said even-numbered field signals to said external devices in a DMA mode,
wherein said external devices, one of which is supplied with said odd-numbered field signals and another of which is supplied with said even-numbered field signals in said DMA mode, comprise a main storage device and a display device in an information processing system,
wherein said main storage is adapted to receive either ones of said odd-numbered field signals said color format of which is specified by said odd-numbered field color format data held in said color format register and said even-numbered field signals said color format of which is specified by said even-numbered field color format data held in said color format register, and
wherein said display device is adapted to receive the others of said odd-numbered field signals said color format of which is specified by said odd-numbered field color format data held in said color format register and said even-numbered field signals said color format of which is specified by said even-numbered field color format data held in said color format register.

11. A video capture device according to claim 3, wherein said transfer control circuit is adapted to transfer each of said odd-numbered field signals and said even-numbered field signals to said external devices in a DMA mode,
wherein said external devices, one of which is supplied with said odd-numbered field signals and another of which is supplied with said even-numbered field signals in said DMA mode, comprise a main storage device and a display device in an information processing system,
wherein said main storage is adapted to receive either ones of said odd-numbered field signals said color format of which is specified by said odd-numbered field color format data held in said color format register and said even-numbered field signals said color format of which is specified by said even-numbered field color format data held in said color format register, and
wherein said display device is adapted to receive the others of said odd-numbered field signals said color format of which is specified by said odd-numbered field color format data held in said color format register and said even-numbered field signals said color format of which is specified by said even-numbered field color format data held in said color format register.

12. A video capture device according to claim 4, wherein said transfer control circuit is adapted to transfer each of said odd-numbered field signals and said even-numbered field signals to said external devices in a DMA mode,
wherein said external devices, one of which is supplied with said odd-numbered field signals and another of which is supplied with said even-numbered field signals in said DMA mode, comprise a main storage device and a display device in an information processing system,
wherein said main storage is adapted to receive either ones of said odd-numbered field signals said color format of which is specified by said odd-numbered field color format data held in said color format register and said even-numbered field signals said color format of which is specified by said even-numbered field color format data held in said color format register, and
wherein said display device is adapted to receive the others of said odd-numbered field signals said color format of which is specified by said odd-numbered field color format data held in said color format register and said even-numbered field signals said color format of which is specified by said even-numbered field color format data held in said color format register.

13. A video capture device according to claim 5, wherein said transfer control circuit is adapted to transfer each of said odd-numbered field signals and said even-numbered field signals to said external devices in a DMA mode, wherein said external devices, one of which is supplied with said odd-numbered field signals and another of which is supplied with said even-numbered field signals in said DMA mode, comprise a main storage device and a display device in an information processing system, wherein said main storage is adapted to receive either ones of said odd-numbered field signals said color format of which is specified by said odd-numbered field color format data held in said color format register and said even-numbered field signals said color format of which is specified by said even-numbered field color format data held in said color format register, and wherein said display device is adapted to receive the others of said odd-numbered field signals said color format of which is specified by said odd-numbered field color format data held in said color format register and said even-numbered field signals said color format of which is specified by said even-numbered field color format data held in said color format register.

14. A video capture device according to claim 6, wherein said transfer control circuit is adapted to transfer each of said odd-numbered field signals and said even-numbered field signals to said external devices in a DMA mode, wherein said external, one of which is supplied with said odd-numbered field signals and another of which is supplied with said even-numbered field signals in said DMA mode, comprise a main storage device and a display device in an information processing system, wherein said main storage is adapted to receive either ones of said odd-numbered field signals said color format of which is specified by said odd-numbered field color format data held in said color format register and said even-numbered field signals said color format of which is specified by said even-numbered field color format data held in said color format register, and wherein said display device is adapted to receive the others of said odd-numbered field signals said color format of which is specified by said odd-numbered field color format data held in said color format register and said even-numbered field signals said color format of which is specified by said even-numbered field color format data held in said color format register.

15. A video capture device according to claim 7, wherein said transfer control circuit is adapted to transfer each of said odd-numbered field signals and said even-numbered field signals to said external devices in a DMA mode, wherein said external devices, one of which is supplied with said odd-numbered field signals and another of which is supplied with said even-numbered field signals in said DMA mode, comprise a main storage device and a display device in an information processing system, wherein said main storage is adapted to receive either ones of said odd-numbered field signals said color format of which is specified by said odd-numbered field color format data held in said color format register and said even-numbered field signals said color format of which is specified by said even-numbered field color format data held in said color format register, and wherein said display device is adapted to receive the others of said odd-numbered field signals said color format of which is specified by said odd-numbered field color format data held in said color format register and said even-numbered field signals said color format of which is specified by said even-numbered field color format data held in said color format register.

16. A video capture device according to claim 8, wherein said transfer control circuit is adapted to transfer each of said odd-numbered field signals and said even-numbered field signals to said external devices in a DMA mode, wherein said external devices, one of which is supplied with said odd-numbered field signals and another of which is supplied with said even-numbered field signals in said DMA mode, comprise a main storage device and a display device in an information processing system, wherein said main storage is adapted to receive either ones of said odd-numbered field signals said color format of which is specified by said odd-numbered field color format data held in said color format register and said even-numbered field signals said color format of which is specified by said even-numbered field color format data held in said color format register, and wherein said display device is adapted to receive the others of said odd-numbered field signals said color format of which is specified by said odd-numbered field color format data held in said color format register and said even-numbered field signals said color format of which is specified by said even-numbered field color format data held in said color format register.

17. A video capture device according to claim 1, wherein said one of said external devices and said another of said external devices may be different devices.

18. A video capture device for processing a video input signal comprising:

a video input circuit adapted to receive a video input signal and to output odd-numbered field signals and even-numbered field signals of an interlace signal;

a color format register adapted to store color format data;

a color processing unit adapted to carry out data processing of said odd-numbered field signals and said even-numbered field signals of said interlace signal; and a transfer control circuit adapted to transfer said odd-numbered field signals and said even-numbered field signals to an external device, wherein odd-numbered field color format data and even-numbered field color format data, are held in said color format register, and may be different color format data values;

wherein said color processing unit is adapted to output said odd-numbered field signals the color format of which is specified by said odd-numbered field color format data held in said color format register and said even-numbered field signals the color format of which is specified by said even-numbered field color format data held in said color format register, and wherein said transfer control circuit is adapted to transfer said odd-numbered field signals of said color format which is specified by said odd-numbered field color format data to a first part of said external device that is specified by a first transfer destination address supplied to said video capture device and transfer said even-numbered field signals of said color format which is specified by said even-numbered field color format data to a second part of said external device that is specified by a second transfer destination address supplied to said video capture device;

wherein said first transfer destination address and said second transfer destination address may be different address values.

19. A video capture device according to claim 18, wherein said first part of said external device and said second part of said external device may be different parts of said external device.

20. A video capture device according to claim 18, further comprising:

a scaling register adapted to hold one of a plurality of scaling data values for each of said odd-numbered fields data and said even-numbered field signals, and odd-numbered field scaling data held in said scaling register being for said odd-numbered fields data and an even-numbered field scaling data held in said scaling register being for said even-numbered fields data, whereby said odd-numbered field scaling data and said even-numbered field scaling data, that are held in said scaling register, may be different scaling data values;

wherein said color processing unit is adapted to output said odd-numbered field signals the resolution of which is specified by said odd-numbered field scaling data stored in said scaling;

register and said even-numbered field signals the resolution of which is specified by said even-numbered field scaling data stored in said scaling register; and wherein said data control circuit is adapted to transfer said odd-numbered field signals of said resolution which is specified by said odd-numbered field scaling data to a first part of said external device that is specified by a first transfer destination address supplied to said video capture device and transfer said even-numbered field signals of said resolution which is specified by said even-numbered field scaling data to a second part of said external device that is specified by a second transfer destination address supplied to said video capture device.

21. A video capture device according to claim 18, wherein said video input circuit converts said video input signal of an analog signal into said odd-numbered field signals and said even-numbered signals of the interlace signal that are digitized.

22. A video capture device according to claim 20, wherein said video input circuit converts said video input signal of an analog signal into said odd-numbered field signals and said even-numbered signals of the interlace signal that are digitized.

23. A video capture device according to claim 18, wherein each of said color format which is specified by said odd-numbered field color format data and said color format which is specified by said even-numbered field color format data can be arbitrarily set to any one selected from the YUV format and the RGB format.

24. A video capture device according to claim 20, wherein each of said color format which is specified by said odd-numbered field color format data and said color format which is specified by said even-numbered field color format data can be arbitrarily set to any one selected from the YUV format and the RGB format.

25. A video capture device according to claim 21, wherein each of said color format which is specified by said odd-numbered field color format data and said color format which is specified by said even-numbered field color format data can be arbitrarily set to any one selected from the YUV format and the RGB format.

26. A video capture device according to claim 22, wherein each of said color format which is specified by said odd-numbered field color format data and said color format which is specified by said even-numbered field color format data can be arbitrarily set to any one selected from the YUV format and the RGB format.

* * * * *

UNITED STATES PATENT AND TRADEMARK OFFICE
CERTIFICATE OF CORRECTION

PATENT NO. : 6,556,767 B2
DATED : April 29, 2003
INVENTOR(S) : Masataka Okayama et al.

It is certified that error appears in the above-identified patent and that said Letters Patent is hereby corrected as shown below:

Title page,
Item [63], change the paragraph under "Related U.S. Application Data" to read as follows:
-- [63] Continuation of application No. 09/526,739, filed on Mar. 16, 2000, now Pat. No. 6,269,215, which is a continuation of application No. 09/260,498, filed on Mar. 2, 1999, now Pat. No. 6,094,521, which is a continuation of application No. 08/750,826, filed as application No. PCT/JP96/02499 on Sept. 4, 1996, now Pat. No. 5,899,575. --

Column 1,
Line 7, replace "Dec. 13, 1996" with -- as application No. PCT/JP96/02499 on Sept. 4, 1996 --; change "5,899,576" to -- 5,899,575 --.
Line 15, change "BACKGROUND TECHNIQUE" to -- BACKGROUND OF THE INVENTION --.
Lines 25, 36 and 42, replace "inputted" with -- input --.

Column 2,
Lines 41, 59 and 67, replace "inputted" with -- input --.

Column 3,
Line 5, replace "DISCLOSURE OF THE INVENTION" with -- SUMMARY OF THE INVENTION --.
Lines 14, 17, 27 and 30, replace "outputted" with -- output --.

Column 4,
Lines 32, 34 and 37, replace "inputted" with -- input --.
Line 39, replace "is" with -- are --.

Column 5,
Line 61, replace "BEST MODES FOR CARRYING OUT THE INVENTION" with -- DETAILED DESCRIPTION --.

UNITED STATES PATENT AND TRADEMARK OFFICE
CERTIFICATE OF CORRECTION

PATENT NO. : 6,556,767 B2
DATED : April 29, 2003
INVENTOR(S) : Masataka Okayama et al.

It is certified that error appears in the above-identified patent and that said Letters Patent is hereby corrected as shown below:

Column 6,
Line 26, replace "as means" with -- as a means --.
Line 28, replace "by an ROM etc." with -- by ROM --.
Lines 29, 37, 46 and 61, replace "is means" with -- is a means --.
Line 47, replace "inputted" with -- input --.
Line 57, replace "has" with -- have --.

Column 7,
Lines 14, 19, 63 and 67, replace "inputted" with -- input --.
Line 18, replace "outputted" with -- output --.
Line 23, after "signal" insert -- 25 --; replace "outputted" with -- output --.
Line 25, replace "dose" with -- does --.
Line 29, replace "outputted" with -- output --.
Line 60, replace "flow in" with -- flow to --.
Line 61, replace "flowing in" with -- flowing from --.

Column 8,
Line 66, replace "is however only" with -- is, however, only --.

Column 9,
Line 2, replace "resisters" with -- registers --.
Line 17, before "displayed" insert -- be --.

Column 10,
Line 62, replace "inputted" with -- input --.

Column 11,
Lines 2 and 29, replace "inputted" with -- input --.

Column 12,
Line 64, replace "A9. further," with -- A9. Further, --.
Line 65, replace "object a" with -- object *a* --.

UNITED STATES PATENT AND TRADEMARK OFFICE
CERTIFICATE OF CORRECTION

PATENT NO.    : 6,556,767 B2
DATED         : April 29, 2003
INVENTOR(S)   : Masataka Okayama et al.

It is certified that error appears in the above-identified patent and that said Letters Patent is hereby corrected as shown below:

Column 13,
Line 1, replace "object a" with -- object $a$ --.
Line 2, replace "object b" with -- object $b$ --.

Column 14,
Line 35, replace "inputted" with -- input --.
Line 45, replace "Indeces" with -- Indices --.
Line 47, replace "indeces" with -- indices --.

Column 17,
Line 41, replace "Flame memory" with -- frame memory --.

Column 18,
Lines 7 and 50, replace "inputted" with -- input --.

Column 19,
Lines 13, 22 and 63, replace "inputted" with -- input --.

Column 20,
Line 1, replace "inputted" with -- input --.
Line 19, delete "those are".

Column 21,
Line 2, replace "which specified" with -- which is specified --.

Column 23,
Line 32, after "external" insert -- devices --.

Signed and Sealed this

Twenty-fifth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,556,767 B2
DATED : April 29, 2003
INVENTOR(S) : Masataka Okayama et al.

It is certified that error appears in the above-identified patent and that said Letters Patent is hereby corrected as shown below:

<u>Title page,</u>
Insert item -- [73] Assignee: Hitachi, Ltd., Tokyo, (JP) --.

Signed and Sealed this

Eleventh Day of October, 2005

JON W. DUDAS
*Director of the United States Patent and Trademark Office*